(12) United States Patent
Hussain et al.

(10) Patent No.: US 9,204,159 B2
(45) Date of Patent: Dec. 1, 2015

(54) VPU WITH PROGRAMMABLE CORE

(75) Inventors: Zahid Hussain, Ascot (GB); John Brothers, Calistoga, CA (US); Jim Xu, San Jose, CA (US)

(73) Assignee: VIA TECHNOLOGIES, INC., Taipei (TW)

( * ) Notice: Subject to any disclaimer, the term of this patent is extended or adjusted under 35 U.S.C. 154(b) by 2614 days.

(21) Appl. No.: 11/763,720

(22) Filed: Jun. 15, 2007

(65) Prior Publication Data

US 2008/0010596 A1 Jan. 10, 2008

Related U.S. Application Data

(60) Provisional application No. 60/814,623, filed on Jun. 16, 2006.

(51) Int. Cl.
*H04N 5/46* (2006.01)
*H04N 19/436* (2014.01)
*H04N 19/61* (2014.01)
*H04N 19/12* (2014.01)
*H04N 19/44* (2014.01)

(52) U.S. Cl.
CPC ............. *H04N 19/436* (2014.11); *H04N 19/12* (2014.11); *H04N 19/44* (2014.11); *H04N 19/61* (2014.11)

(58) Field of Classification Search
CPC ....... H04N 5/46; H04N 5/4401; H04N 19/61; H04N 19/13; H04N 19/44
USPC .................................................. 348/553–558
See application file for complete search history.

(56) References Cited

U.S. PATENT DOCUMENTS

| | | | |
|---|---|---|---|
| 5,973,748 A * | 10/1999 | Horiguchi et al. | 348/554 |
| 6,496,537 B1 | 12/2002 | Kranawetter et al. | |
| 6,717,988 B2 | 4/2004 | Peng et al. | |
| 6,871,001 B1 | 3/2005 | Okada | |
| 7,583,732 B2 * | 9/2009 | Gordon et al. | 375/240.25 |
| 7,684,489 B2 | 3/2010 | Johansen et al. | |
| 2004/0071217 A1 | 4/2004 | Lin | |
| 2005/0122341 A1 | 6/2005 | MacInnis et al. | |
| 2005/0262276 A1 | 11/2005 | Singh et al. | |
| 2009/0122190 A1* | 5/2009 | Rodriguez et al. | 348/500 |

FOREIGN PATENT DOCUMENTS

| | | |
|---|---|---|
| JP | 2001-285802 | 10/2001 |
| WO | 2004/030369 | 4/2004 |
| WO | 2004/091101 | 10/2004 |
| WO | WO 2004/105399 | 12/2004 |

OTHER PUBLICATIONS

English language translation (computer-generated translation) of JP 2001-285802 (published Oct. 12, 2001).

\* cited by examiner

*Primary Examiner* — Michael Lee
(74) *Attorney, Agent, or Firm* — McClure, Qualey & Rodack, LLP

(57) ABSTRACT

Included are embodiments for processing video data. At least one embodiment includes a logic configured to receive video data having a format chosen from at least two formats and logic configured to receive an instruction from an instruction set including an indication of the format of the video data. Some embodiments include first parallel logic configured to process video data according to a first format in response to the indication is the first format and second parallel logic configured to process the video data according to a second format in response to the indication is the second format.

16 Claims, 25 Drawing Sheets

VPU WITH PROGRAMMABLE CORE

CROSS-REFERENCE TO RELATED APPLICATION

This application claims priority to U.S. provisional application Ser. No. 60/814,623, filed Jun. 16, 2006, the contents of which are incorporated by reference herein.

TECHNICAL FIELD

This disclosure relates to processing video and graphics data. More specifically, this disclosure relates to providing a Video Processing Unit with a programmable core.

BACKGROUND

As computer technologies have evolved, demands on a computing device have also evolved. More specifically, many computer applications and/or data streams require the processing of video data. As video data becomes more sophisticated, processing requirements for the video data increases.

Currently, many computing architectures provide a Central Processing Unit (CPU) for processing data, including video and graphics data. While a CPU may provide adequate processing capabilities for some video and graphics, a CPU may also be configured to process other data. As such, the demands on a CPU in processing sophisticated video and graphics, may detrimentally affect performance of the entire system.

Additionally, many computing architectures include one or more Execution Units (EUs) for processing data. More specifically, in at least one configuration, an EU may be configured to process a plurality of different types of data. As with the CPU, the demands on the EUs may be such that processing sophisticated video and graphics data may detrimentally affect performance of the entire computing system. Additionally, processing of sophisticated video and graphics data by the EUs may increase power consumption beyond an acceptable threshold. Further, the institution of different protocols of data may further limit the ability for the EUs to process that video and graphics data. Additionally, many current computing architectures provide 32-bit instructions, which may reduce efficiency, thus affecting processing speed. Further, utilization of a plurality of operations in a single component is also desired.

Thus, a heretofore unaddressed need exists in the industry to address the aforementioned deficiencies and inadequacies.

SUMMARY

Included are embodiments for processing video data. At least one embodiment includes a programmable Video Processing Unit that includes logic configured to receive video data having a format chosen from at least two formats and a logic configured to receive an instruction from an instruction set including an indication of the format of the video data. Some embodiments include first parallel logic configured to process video data according to a first format in response to the indication is the first format and second parallel logic configured to process the video data according to a second format in response to the indication is the second format, where the instruction set includes an indication of whether to process the data according to the first format, and wherein the instruction set includes an indication of whether to process the data according to the second format.

Also included are embodiments of a programmable Video Processing unit for processing video data in at least two formats. At least one embodiment includes filter logic configured to filter the video data according to the format of the video data, transform logic configured to transform the video data according to the format of the video data and logic configured to output the video data for future processing. The filter logic is configured to operate in parallel with the transform logic.

Also included are embodiments of a method for processing video data, including receiving an instruction from an instruction set, receiving video data having a format chosen from at least two formats, and processing the video data according to the instruction. The instruction set includes an indication of the format of the video data, and the processing of video data utilizes a plurality of algorithms in response to the indication of the format.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
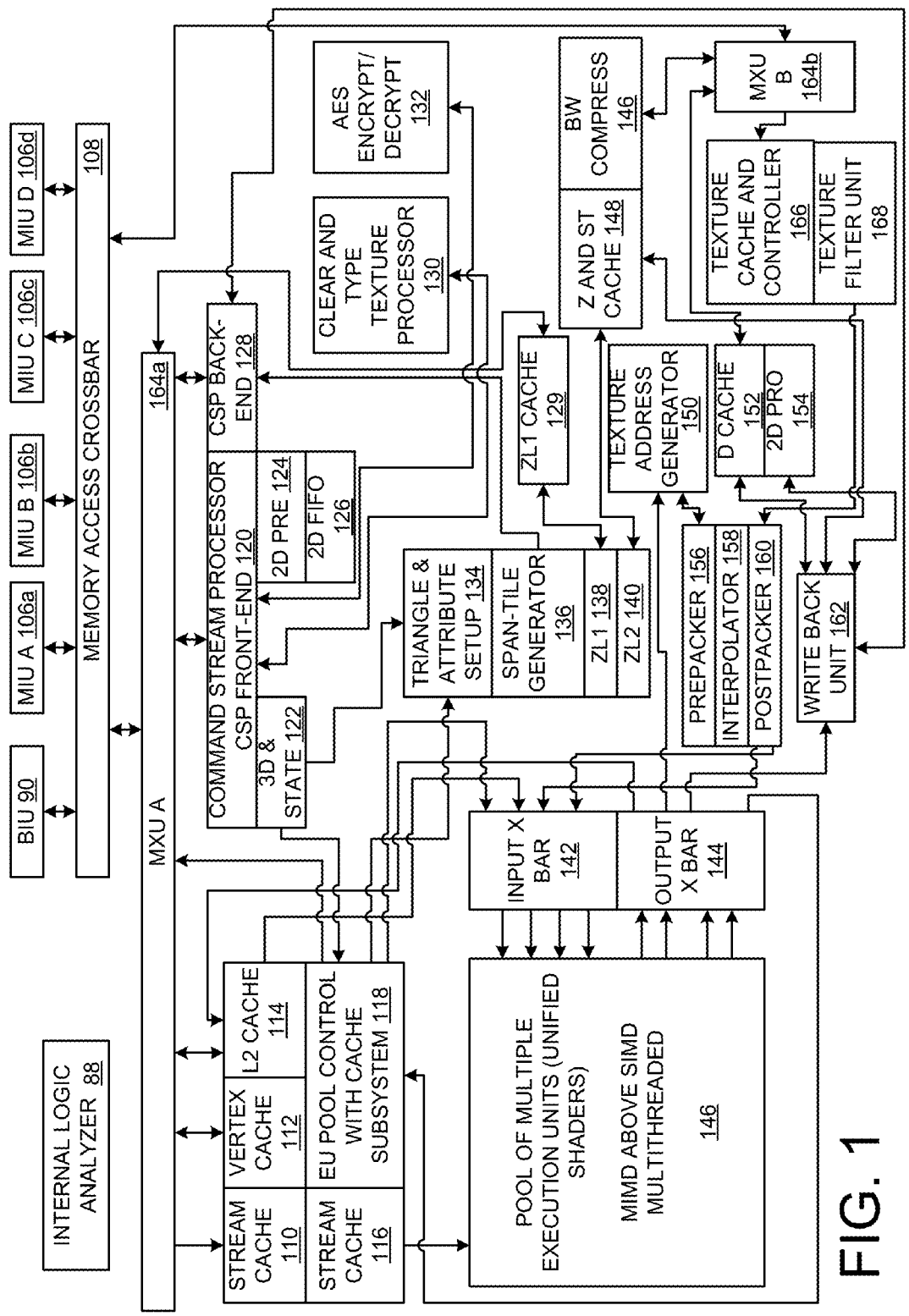
FIG. 1 is an exemplary embodiment of a computing architecture for processing video data.

FIG. 1 is an exemplary embodiment of a computing architecture for processing video data. As illustrated in the nonlimiting example of FIG. 1, a computing device may include a pool of Execution Units (EUs) 146. Pool of execution units 146 may include one or more execution units for executing data in the computing architecture of FIG. 1. Pool of execution units 146 (referred to herein as "EUP 146") may be coupled to and receive data from stream cache 116. EUP 146 may also be coupled to input cross bar 142 and output cross bar 144. Input cross bar 142 may be configured to receive data from EU pool control with cache subsystem 118. Input cross bar 142 may also receive data from L2 cache 114, as well as postpacker 160. EUP 146 may process the received data and output the processed data to output crossbar 144.

Additionally, EU pool control with cache subsystem 118 may send data to memory access unit (MXU) A 164a, as well as triangle and attribute setup 134. L2 cache 114 may also send and receive data from MXU A 164a. Vertex cache 112 may also communicate with MXU A 164a, as can stream cache 110. Also in communication with MXU A 164a is memory access crossbar 108. Memory access crossbar 108 may communicate data with Bus Interface Unit (BIU) 90, Memory Interface Unit (MIU) A 106a, MIU B 106b, MIU C 106c, and MIU D 106d. Memory access crossbar 108 may also be coupled to MXU B 164b.

MXU A 164a is also coupled to command stream processor (CSP) front-end 120 and CSP back-end 128. CSP front-end 120 is coupled to 3D and state component 122, which is coupled to EU pool control with cache subsystem 118. CSP front-end 120 is also coupled to 2D pre component 124, which is coupled to 2D first in, first out (FIFO) component 126. CSP front end also communicates data with clear and type texture processor 130 and Advanced Encryption System (AES) encrypt/decrypt 132. CSP back-end 128 is coupled to span-tile generator 136.

Triangle and attribute setup 134 is coupled to 3D and state 122, EU pool control with cache subsystem 118, as well as span-tile generator 136. Span-tile generator 136 may be configured to send data to ZL1 cache 129. Span-tile generator 136 may also be coupled to ZL1 138, which may send data to ZL1 cache 129. ZL2 140 may be coupled to Z (e.g., depth buffer cache) and stencil (ST) cache 148. Z and ST cache 148 may send and receive data with write back unit 162 and may be coupled to Bandwidth (BW) compress 146. BW compress 146 may also be coupled to MXU B 164b, which may be coupled to texture cache and controller 166. Texture cache and controller 166 may be coupled to a texture filter unit (TFU) 168, which may send data to postpacker 160. Postpacker 160 may be coupled to interpolator 158. Prepacker 156 may be coupled to interpolator 158, as well as texture address generator 150. Write back unit 162 may be coupled to 2D pro 154, D cache 152, Z and ST cache 148, input cross bar 142, and CSP back-end 128.

The exemplary embodiment of FIG. 1 may be configured to process video data via utilization of EUP 146. More specifically, in at least one embodiment, one or more of the execution units may be configured to process video data. While this configuration may be adequate for some applications, such a configuration may consume an excessive amount of power. Additionally, this configuration may have difficulty processing H.264 data.

Figure 2:
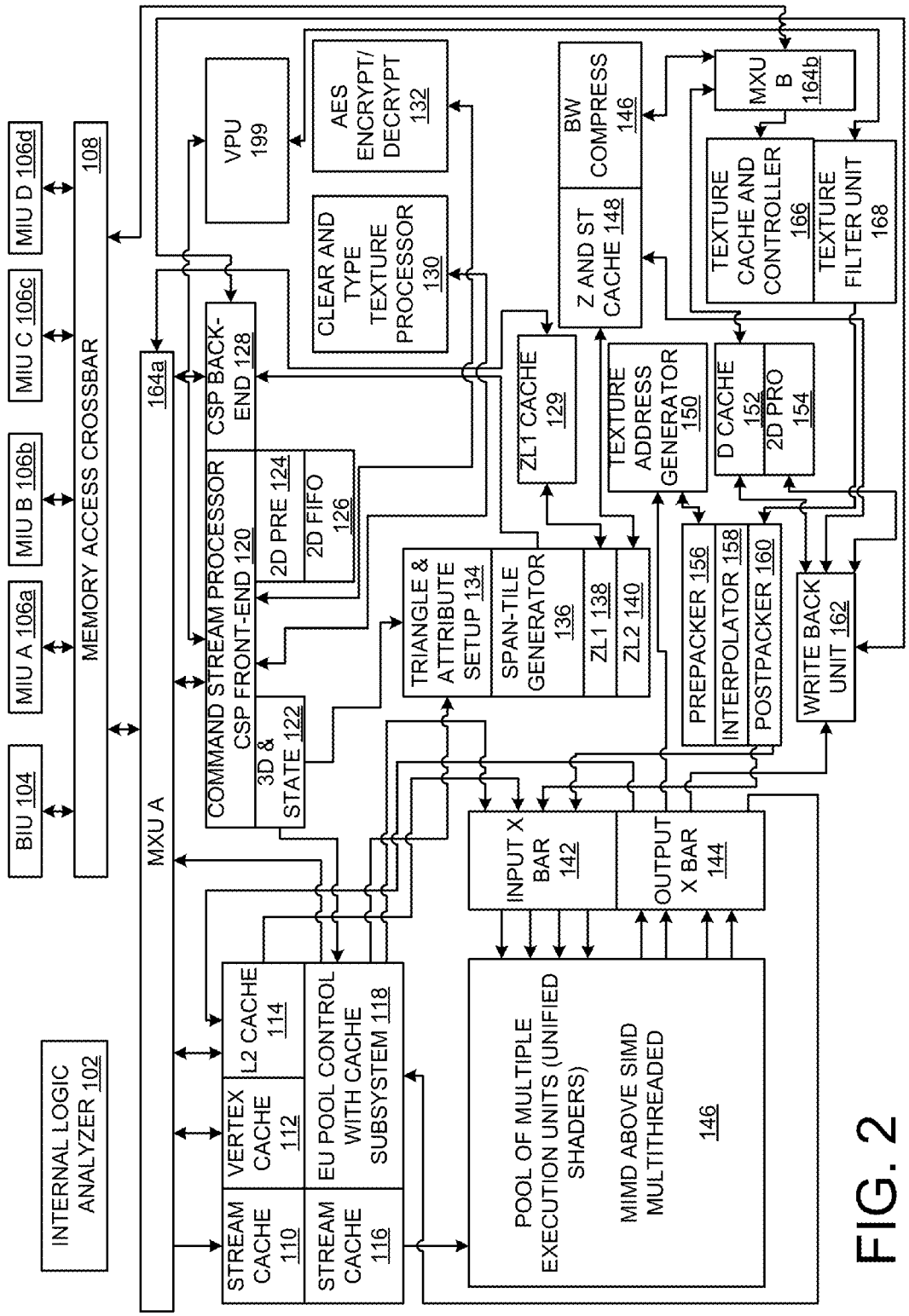
FIG. 2 is an exemplary embodiment of a computing architecture, with introduction of a Video Processing Unit (VPU), similar to the architecture from FIG. 1.

FIG. 2 is an exemplary embodiment of a computing architecture, with introduction of a Video Processing Unit (VPU), similar to the architecture from FIG. 1. More specifically, in the nonlimiting example of FIG. 2, a Video Processing Unit (VPU) 199 with programmable core may be provided in the computing architecture from FIG. 1. VPU 199 may be coupled to CSP front-end 120, as well as texture filter unit (TFU) 168. VPU 199 may be configured to operate as a dedicated processor for video data. Additionally, VPU 199 may be configured to process video data encoded in Moving Picture Experts Group (MPEG), VC-1, and H.264 protocols.

More specifically, in at least one exemplary embodiment, a shader code may be executed on one or more of the Execution Units (EUs) 146. The instructions may be decoded and registers fetched. Major and minor opcodes may be configured to determine the EU 146 to which the operands are to be routed and the function that may operate upon the operands. If the operation is of a SAMPLE type (e.g., all the VPU instructions are SAMPLE type), then the instruction may dispatched from the EU pool 146. A VPU 199 may reside with the Texture Filter Unit (TFU) 168, although the VPU 199 may be configured to refrain from using the TFU filter hardware.

The EU pool 146 for SAMPLE operations builds a 580-bit data structure (see Table 1). The EU pool 146 fetches source registers specified in the SAMPLE instruction. This data is placed in the least significant 512-bits of the EUP-TAG interface structure. The other relevant data the EU pool 146 inserts into this structure are:

REG_TYPE: this shall be 0
  ThreadID - this is required to route the result back to the correct shader program
  ShaderResID -
  ShaderType = PS
  CRFIndex - destination registers
  SAMPLE_MODE - this is the VPU filter operation to be performed
  ExeMode = Vertical This data structure may then be sent to the Texture Address Generator (TAG) 150. The TAG 150 may be configured to examine the SAMPLE_MODE bits to determine whether the data fields contain texture sample information or actual data. If actual data then the TAG 150 bypasses the data directly to the VPU 199, otherwise the TAG 150 can initiate texture fetch.

TABLE 1

EUP-TAG Interface for video processing.

| Data Entry | XOUT_TAG_DATA | 580 | | | |
|---|---|---|---|---|---|
| Field | Data | 512 | 511 | 0 | 4 × 4 × 32 |
| Field | Req Type?? | 1 | 525 | 525 | request type: 0 - sample, 1 - resinfo |
| Field |  | 7 | 533 | 527 | not used (reserved) |
| Field |  | 4 | 537 | 534 | not used (reserved) |
| Field | Write_Mask | 4 | 541 | 538 | texel component write mask |
| Field | Thread Id | 6 | 547 | 542 | EU thread |
| Field | Shader Res ID | 2 | 551 | 550 | shader context |
| Field | Shader Type | 3 | 553 | 552 | 00: VS<br>01: GS<br>10: PS<br>11: PS_PF |
| Field | CRF Index | 8 | 565 | 558 | EU return address 6 + 2 sub id |
| Field | Sample Mode | 5 | 570 | 566 | 01000: SAMPLE_MCF_BLR<br>01001: SAMPLE_MCF_VC1<br>01010: SAMPLE_MCF_H264<br>01111: SAMPLE_SAD<br>01011: SAMPLE_IDF_VC1<br>01100: SAMPLE_IDF_H264_0<br>01101: SAMPLE_IDF_H264_1<br>01110: SAMPLE_IDF_H264_2<br>10000: SAMPLE_TCF_I4X4<br>10001: SAMPLE_TCF_M4X4<br>10010: SAMPLE_TCF_MPEG2<br>10011: SAMPLE_MADD<br>10100: SAMPLE_SMMUL |
| Field | exe_mode | 1 | 571 | 571 | execution mode |
| Value | Horizontal | 1 | | | |
| Value | Vertical | 0 | | | |
| Field | Bx2 | 1 | 572 | 572 | _bx2 modification. Note, for sample_Id this flag is used to indicate whether a sampler is used, 0 - without s# and 1 - with s# (used by video). |
| Field | <R> | 9 | 579 | 573 | Reserved |

If the SAMPLE_MODE is one of MCF, SAD, IDF_VC-1, IDF_H264_0 or IDF_H264_1, then it requires texture data, otherwise the data is in the Data field.

The information utilized by the TAG 150 for generating the address and passing this information to the Texture Cache Controller (TCC) 166 can be found in the least significant 128-bit of Data field:

Bits[31:0]—U,V coordinates, this constitutes the address for the texture block (4×4×8-bit)
Bits[102:96]—T#
Bits[106:103]—S#

The T#, S#, U and V are sufficient information for the texture to be fetched from the specified surface. The U,V,T#, S# are extracted from SRC1 of the INSTRUCTION and used in filling the above field during the decode phase. Thus U,V, T#,S# may be modified dynamically during execution.

Then the SAMPLE_MODE and the least-significant 128-bits of data containing this information may be placed in a COMMAND FIFO for the VPU 199. The corresponding DATA FIFO may be filled with either the bypassed data (bits[383:128]) or 256-bit (max) from the texture cache. This data will be operated on in the VPU 199, the operation determined by the COMMAND FIFO information. The result (max 256-bit) may be returned to the EUP 146 and EU Register using the ThreadID and CRFIndex as return address.

Additionally included in this disclosure is an instruction set that may be provided by EUP 146 and utilized by VPU 199. The instructions may be formatted in 64-bits, however this is not a requirement. More specifically, in at least one nonlimiting example, one or more Motion Compensated Filtering (MCF) instructions may be included with a VPU instruction set. In this nonlimiting example, one or more of the following MCF instructions may be present:

| | |
|---|---|
| SAMPLE_MCF_BLR | DST, SRC2, SRC1 |
| SAMPLE_MCF_VC1 | DST, SRC2, SRC1 |
| SAMPLE_MCF_H264 | DST, SRC2, SRC1 |

The first 32-bits of SRC1 contains the U, V coordinates, with the least significant 16-bits being U. SRC2 may be any value as SRC2 may not be used, and may be ignored. SRC2 may be a 32-bit value that contains a 4 element filter kernel, each element being 8-bit signed as shown below.

TABLE 2

MCF filter kernel
FILTER KERNEL (SRC2)

| 31 30 29 28 27 26 25 24 | 23 22 21 20 19 18 17 16 | 15 14 13 12 11 10 09 08 | 07 06 05 04 03 02 01 00 |
|---|---|---|---|
| Kernel[3] | Kernel[2] | Kernel[2] | Kernel[0] |

Additionally included in an exemplary instruction set for VPU 199 are instructions related to Inloop Deblocking Filtering (IDF). As a nonlimiting example, one or more of the following instructions may be provided to VPU 199:

| | |
|---|---|
| SAMPLE_IDF_VC1 | DST, SRC2, SRC1 |
| SAMPLE_IDF_H264_0 | DST, SRC2, SRC1 |
| SAMPLE_IDF_H264_1 | DST, SRC2, SRC1 |
| SAMPLE_IDF_H264_2 | DST, SRC2, SRC1 |

For VC-1 IDF operation, the TFU 168 may provide an 8×4×8-bit (or 4×8×8-bit) data into the filter buffer. However, for H.264, the amount of data delivered by the TFU 168 may be controlled depending on the type of H.264 IDF operation.

With the SAMPLE_IDF_H264_0 instruction, the TFU supplies an 8×4×8-bit (or 4×8×8-bit) block data. With the SAMPLE_IDF_H264_1 instruction, the TFU 168 supplies a 4×4×8-bit block of data and the other 4×4×8-bit data is supplied by the shader (EU) 146 (FIG. 2). Additionally, with SAMPLE_IDF_H264_2, both the 4×4×8-bit block data may be supplied by the shader (EU) 146, none from the TFU 168.

Additionally, Motion Estimation (ME) instructions may be included with the instruction set for VPU 199. As a nonlimiting example, an instruction such as listed below may be included:

| | |
|---|---|
| SAMPLE_SAD | DST, SRC2, SRC1. |

The above instruction may be mapped to the following Major and Minor opcode mappings and take the format described above. Details of the SRC and DST formats are discussed below in the relevant instruction sections.

TABLE 4

Motion Compensation
Filtering and corresponding opcode

| Instruction | Minor OPCOCDE | | | | Comment |
|---|---|---|---|---|---|
| SSAMPLE_MCF_BLR | 0 | 0 | 0 | 0 | |
| SSAMPLE_MCF_VC1 | 0 | 0 | 0 | 1 | |
| SSAMPLE_MCF_H264 | 0 | 0 | 1 | 0 | |
| SSAMPLE_IDF_VC-1 | 0 | 0 | 1 | 1 | |
| SSAMPLE_IDF_H264_0 | 0 | 1 | 0 | 0 | |
| SSAMPLE_IDF_H264_1 | 0 | 1 | 0 | 1 | |
| SSAMPLE_IDF_H264_2 | 0 | 1 | 1 | 0 | |
| SSAMPLE_SAD | 0 | 1 | 1 | 1 | |

TABLE 5

Transform Coefficient Filtering (TCF) and corresponding opcode

SAMPLE_TCF_MPEG2    No data from Texture Cache

| Instruction | Minor OPCOCDE | | | | Comment |
|---|---|---|---|---|---|
| SAMPLE_TCF_I4x4 | 0 | 0 | 0 | 0 | |
| SAMPLE_TCF_M4x4 | 0 | 0 | 0 | 1 | |
| SAMPLE_TCF_MPEG2 | 0 | 0 | 1 | 0 | |

Figure 3:
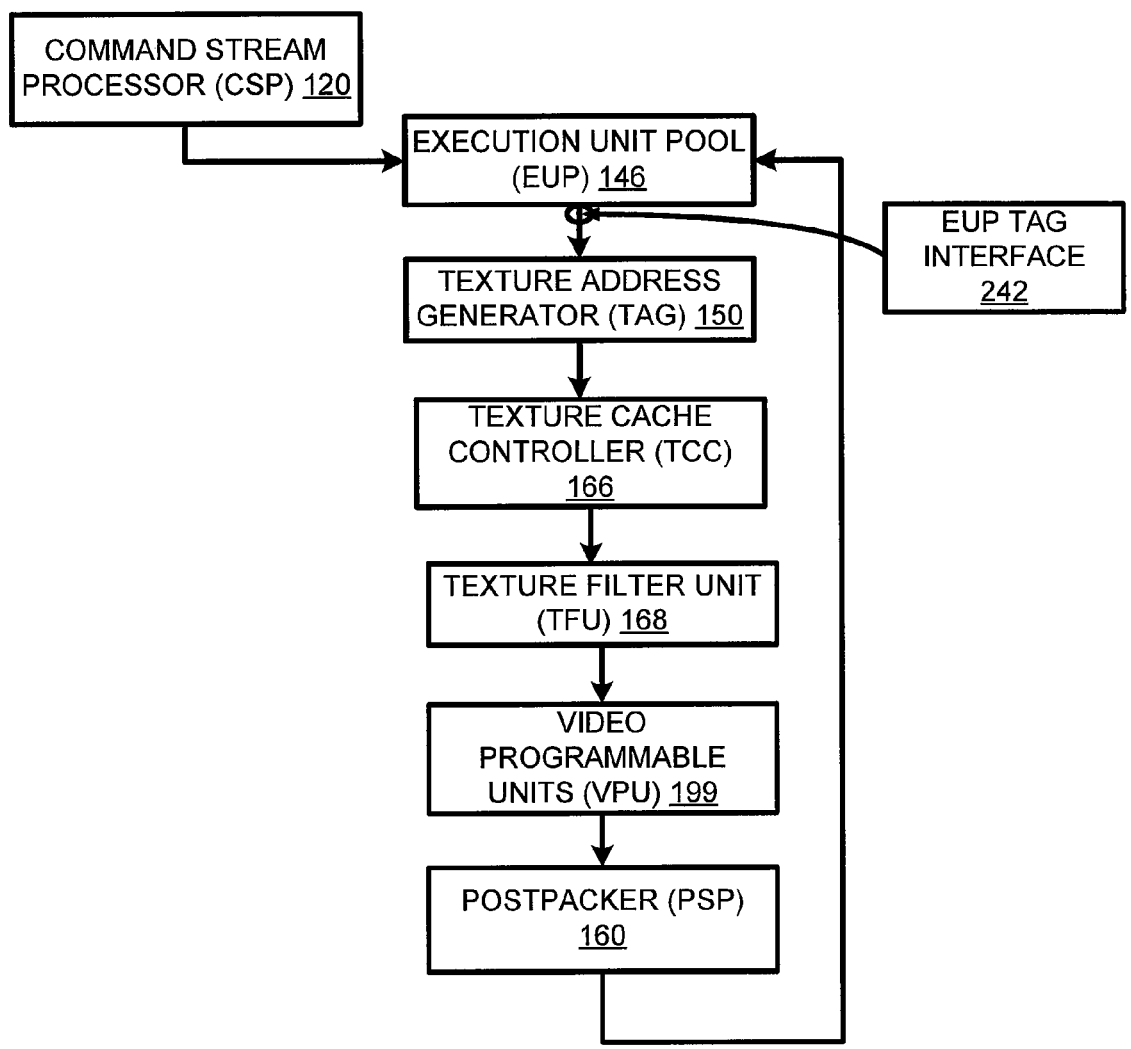
FIG. 3 is an exemplary embodiment of a flow diagram illustrating a process for processing video and graphics data, such as in the computing architecture from FIG. 2.

The SAMPLE instruction follows the execution path shown in FIG. 3. Additionally, the EUP-TAG interface is presented in Table 6, below. Other interfaces may also be provided in more detail below.

TABLE 3

Motion Estimation and corresponding opcode, where LCK indicates that LOCK, if bit set locks the EU data path and does not allow another thread to enter the pipe. NEG indicates inverting the predicate register. S#, T# fields are ignored by the VPU SAMPLE instructions. Rather the T#, S# fields coded in SRC1 are used instead.

| 31 | 30 | 29 | 28 | 27 | 26 | 25 | 24 | 23 | 22 | 21 | 20 | 19 | 18 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|
| S# | | | | T# | | | | | | | | S2S | | | | | SRC2 | | | | S1S | | | | | SRC1 | | | | |
| 63 | 62 | 61 | 60 | 59 | 58 | 57 | 56 | 55 | 54 | 53 | 52 | 51 | 50 49 | 48 | 47 | 46 | 45 | 44 | 43 | 42 | 41 | 40 | 39 | 38 | 37 | 36 | 35 | 34 | 33 | 32 |
| | RPT | | | SRCP | | | | | | 1 | 0 | 1 | 0    0 | | DS | | | | DST | | | | | | Minor opcode | | | | | LCK |

TABLE 6

EUP-TAG Interface for video processing.

Data Entry  XOUT_TAG_DATA  580

| | | | | | |
|---|---|---|---|---|---|
| Field | Data | 512 | 511 | 0 | 4 × 4 × 32 |
| Field | Req Type?? | 1 | 525 | 525 | request type: 0 - sample, 1 - resinfo |
| Field | T# | 7 | 533 | 527 | index to texture 0~127 |
| Field | S# | 4 | 537 | 534 | index to sampler 0~15 |
| Field | Write_Mask | 4 | 541 | 538 | texel component write mask |
| Field | Thread Id | 6 | 547 | 542 | EU thread |
| Field | Shader Res ID | 2 | 551 | 550 | shader context |
| Field | Shader Type | 3 | 553 | 552 | 00: VS<br>01: GS<br>10: PS<br>11: PS_PF |
| Field | CRF Index | 8 | 565 | 558 | EU return address 6 + 2 sub id |
| Field | Sample Mode | 5 | 570 | 566 | 01000: SAMPLE_MCF_BLR<br>01001: SAMPLE_MCF_VC1<br>01010: SAMPLE_MCF_H264<br>01111: SAMPLE_SAD<br>01011: SAMPLE_IDF_VC1<br>01100: SAMPLE_IDF_H264_0<br>01101: SAMPLE_IDF_H264_1<br>01110: SAMPLE_IDF_H264_2<br>10000: SAMPLE_TCF_I4X4<br>10001: SAMPLE_TCF_M4X4<br>10010: SAMPLE_TCF_MPEG2<br>10011: SAMPLE_MADD<br>10100: SAMPLE_SMMUL |
| Field | exe_mode | 1 | 571 | 571 | execution mode |
| Value | Horizontal | 1 | | | |
| Value | Vertical | 0 | | | |
| Field | Bx2 | 1 | 572 | 572 | _bx2 modification. Note, for sample_Id this flag is used to indicate whether a sampler is used, 0 - without s# and 1 - with s# (used by video). |
| Field | <R> | 9 | 579 | 573 | Reserved |

One should note that the Texture Sample Filter operations may also be mapped to the Sample Mode field, in this case the value is 00XXX. The values 11XXX are currently reserved for future usage. Additionally, in at least one embodiment disclosed herein, some video functionality may be inserted into texture pipeline to reuse the L2 cache logic and some of the L2 to filter data loading MUX. There may be one or more cases, like ME (motion estimation), MC (motion compensation), TC (transform coding) and ID (inloop deblocking).

The following table summarizes the data-loading guidelines from TCC 166 and/or TFU 168 for the variant sample instructions. One should note that, depending on the particular configuration, the Sample_MC_H264 may be only utilized for Y plane, but not necessarily for CrCb plane.

TABLE 7

Data loading for video

| INSTRUCTION | Comment | Y Plane | CrCb Plane |
|---|---|---|---|
| SAMPLE_MC_BLR | 8 × 8 × 8-bit block from Texture Cache | Yes | Yes |
| SAMPLE_MC_VC1 | 12 × 12 × 8-bit block from Texture Cache | Yes | Yes |
| SAMPLE_MC_H264 | 12 × 12 × 8-bit block from Texture Cache | Yes | No |
| SAMPLE_SAD | 8 × 4 × 8-bit block from Texture Cache, V can be any alignment | Yes | Yes |
| SAMPLE_IDF_VC1 | 8 × 4 × 8-bit (or 4 × 8 × 8-bit) from Texture Cache, 32-bit aligned | Yes | Yes |
| SAMPLE_IDF_H264_0 | 8 × 4 × 8-bit (or 4 × 8 × 8-bit) from Texture Cache, 32-bit aligned | Yes | Yes |
| SAMPLE_IDF_H264_1 | 4 × 4 × 8-bit from Texture Cache, 32-bit aligned | Yes | Yes |
| SAMPLE_IDF_H264_2 | No data from Texture Cache | | |
| SAMPLE_TCF_I4×4 | No data from Texture Cache | | |
| SAMPLE_TCF_M4×4 | No data from Texture Cache | | |
| SAMPLE_TCF_MPEG2 | No data from Texture Cache | | |
| SAMPLE_MADD | No data from Texture Cache | | |
| SAMPLE_SMMUL | No data from Texture Cache | | |

In at least one embodiment disclosed herein, the Y-plane may include a HSF_Y0Y1Y2Y3_32BPE_VIDEO2 tiling format. CrCb plane includes interleaved CrCb channels and treated as HSF_CrCb_16BPE_VIDEO tiling format. If CbCr interleaved plane is not desired, then for Cb or Cr, one may utilize the same format as per Y plane.

Additionally, the following instructions have been added to the Shader Instruction Set Architecture (ISA).

| | |
|---|---|
| SAMPLE_MCF_BLR | DST, SRC2, SRC1 |
| SAMPLE_MCF_VC1 | DST, SRC2, SRC1 |
| SAMPLE_MCF_H264 | DST, SRC2, SRC1 |
| SAMPLE_IDF_VC1 | DST, SRC2, SRC1 |
| SAMPLE_IDF_H264_0 | DST, SRC2, SRC1 |
| SAMPLE_IDF_H264_1 | DST, SRC2, SRC1 |
| SAMPLE_SAD | DST, SRC2, SRC1 |
| SAMPLE_TCF_MPEG2 | DST, #ctrl, SRC2, SRC1 |
| SAMPLE_TCF_I4x4 | DST, #ctrl, SRC2, SRC1 |
| SAMPLE_TCF_M4x4 | DST, #ctrl, SRC2, SRC1 |
| SAMPLE_MADD | DST, #ctrl, SRC2, SRC1 |
| SAMPLE_IDF_H264_2 | DST, #ctrl, SRC2, SRC1 | ctrl for SAMPLE_IDF_H264_2 shall be zero.

SRC1, SRC2 and #ctrl (where available) may be configured to form the 512-bit data fields in the EU/TAG/TCC interface as shown in Table 8, below.

TABLE 8

Data fields for a plurality of control signals

| CONTROL | VALUE | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Control_3 | | | | | | | | | | | | | | | | |
| Control_0 | | | | | | | | | | | | | | | | |
| Control_1 | | | | | | | | | | | | | | | | |
| | Line 1 | | | | | | | | | | | | | | | |
| Control_2 | IndexB | | | | | IndexA | | | | | bS | | | | CBCR | |
| | 63 | 62 | 61 | 60 | 59 | 58 | 57 | 56 | 55 | 54 | 53 | 52 | 51 | 50 | 49 | 48 |
| | Line 3 | | | | | | | | | | | | | | | |
| | IndexB | | | | | IndexA | | | | | bS | | | | | |
| Control_4 | | | | | | | | | | | | | | | MMODE | |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Control_3 | | | | | | | | | MATRIX INDEX | | | | TR | | MODE | |
| Control_0 | | | | | | | | | | | | | | YC | | BR |
| Control_1 | | | | | | YC | | FD | | | | PQUANT | | | | |
| | Line 0 | | | | | | | | | | | | | | | |
| Control_2 | IndexB | | | | | IndexA | | | | | bS | | | | CEF | |
| | 47 | 46 | 45 | 44 | 43 | 42 | 41 | 40 | 39 | 38 | 37 | 36 | 35 | 34 | 33 | 32 |
| | Line 2 | | | | | | | | | | | | | | | |
| | IndexB | | | | | IndexA | | | | | bS | | | | FD | |
| Control_4 | | SP | | | | | | | | SM | | | | | | |

TABLE 9

Format for SRC1, SRC2 and #ctrl

| | BYTES | | | | | | | | | | | | | | |
|---|---|---|---|---|---|---|---|---|---|---|---|---|---|---|---|
| | 34 | 33 | 32 | 31 | 30 | 29 | 28 | 27 | 26 | 25 | 24 | 23 | 22 | 21 | 20 |
| Instruction | SRC2 + 1 (ODD) | | | | | | | SRC2 (EVEN) | | | | | | | |
| SAMPLE_MCF_X | Undefined | | | | | | | Undefined | | | | | | | |
| SAMPLE_IDF_VC1 | Undefined | | | | | | | Undefined | | | | | | | |
| SAMPLE_SAD | Undefined | | | p33 | p32 | p31 | p30 | p23 | p22 | p21 | p20 | p13 | p12 | p11 | p10 |
| SAMPLE_IDF_H264_0 | Undefined | | | | | | | Undefined | | | | | | | |
| SAMPLE_IDF_H264_1 | Undefined | | | p33 | p32 | p31 | p30 | p23 | p22 | p21 | p20 | p13 | p12 | p11 | p10 |
| SAMPLE_IDF_H264_2 | Second Register Pair | | | p33 | p32 | p31 | p30 | p23 | p22 | p21 | p20 | p13 | p12 | p11 | p10 |
| SAMPLE_TCF_X | Second Register Pair | | | m33 | | m32 | | m31 | | m30 | | m23 | | m22 | |
| SAMPLE_SMMUL | Second Register Pair | | | m33 | | m32 | | m31 | | m30 | | m23 | | m22 | |

| | BYTES | | | | | | | | | | | | | | | | | | |
|---|---|---|---|---|---|---|---|---|---|---|---|---|---|---|---|---|---|---|---|
| | 19 | 18 | 17 | 16 | 15 | 14 | 13 | 12 | 11 | 10 | 9 | 8 | 7 | 6 | 5 | 4 | 3 | 2 | 1 | 0 |
| Instruction | SRC2 (EVEN) | | | | | | | | | SRC1 | | | | | | | | | |
| SAMPLE_MCF_X | Undefined | | | | Control_5 | | | | Undefined | | | | Control_0 | | | | V | | U |
| SAMPLE_IDF_VC1 | Undefined | | | | Control_5 | | | | Undefined | | | | Control_1 | | | | V | | U |
| SAMPLE_SAD | p03 | p02 | p01 | p00 | Control_5 | | | | Undefined | | | | Control_2 | | | | V | | U |
| SAMPLE_IDF_H264_0 | Undefined | | | | Control_5 | | | | Control_2 | | | | | | | | V | | U |
| SAMPLE_IDF_H264_1 | p03 | p02 | p01 | p00 | Control_5 | | | | Control_2 | | | | | | | | V | | U |
| SAMPLE_IDF_H264_2 | p03 | p02 | p01 | p00 | Control_5 | | | | Control_2 | | | | | | | | Undefined | | |
| SAMPLE_TCF_X | m21 | | m20 | | Undefined | | | | Control_3 | | | | | | | | Undefined | | |
| SAMPLE_SMMUL | m21 | | m20 | | Undefined | | | | Control_4 | | | | | | | | Undefined | | |

TABLE 9-continued

| Format for SRC1, SRC2 and #ctrl | | | | | | | | | | | | | | | |
|---|---|---|---|---|---|---|---|---|---|---|---|---|---|---|---|
| | BYTES | | | | | | | | | | | | | | |
| | 47 | 46 | 45 | 44 | 43 | 42 | 41 | 40 | 39 | 38 | 37 | 36 | 35 | 34 | 33 32 |
| SAMPLE_TCF_X Second Register Pair | m33 | | m32 | | m31 | | m30 | | m23 | | m22 | | m21 | | m20 |
| SAMPLE_IDF_H264_2 Second Register | p33 | p32 | p31 | p30 | p23 | p22 | p21 | p20 | p13 | p12 | p11 | p10 | p03 | p02 | p01 p00 |

| | 31 30 | 29 28 | 27 26 | 25 24 | 23 22 | 21 20 | 19 18 | 17 16 | 15 14 | 13 12 | 11 | 10 | 9 8 | 7 | 6 | 5 | 4 | 3 | 2 | 1 | 0 |
|---|---|---|---|---|---|---|---|---|---|---|---|---|---|---|---|---|---|---|---|---|---|
| Control_5 | Undefined | | | | | | | | | | | | S# | | | | T# | | | | |

Referring to Table 8, Tr=transpose; FD=Filter Direction (Vertical=1); bS=boundary strength; bR=bRcontrol, YC=1 if CbCr and 0 if Y and CEF=ChromaEdgeFlag. Additionally, where 32-bits or (or fewer) are used for SRC1 or SRC2 (rest being undefined), the lane selection may be specified to minimize register usage.

While instruction formats are described above, a summary of instruction operation is included below, in Table 10.

TABLE 10

| Instruction summary | | |
|---|---|---|
| Instruction Name | Instruction Format | Instruction Operation |
| SAMPLE_MCF_BLR | SAMPLE_MCF_BLR DST, SRC2, SRC1 | MC filtering implementation |
| SAMPLE_MCF_VC1 | SAMPLE_MCF_VC1 DST, SRC2, SRC1 | MC filtering implementation for VC-1 |
| SAMPLE_MCF_H264 | SAMPLE_MCF_H264 DST, SRC2, SRC1 | MC filtering implementation for H.264 |
| SAMPLE_IDF_VC1 | SAMPLE_IDF_VC1 DST, SRC2, SRC1 | VC-1 deblocking operation |
| SAMPLE_IDF_H264_0 | SAMPLE_IDF_H264_0 DST, SRC2, SRC1 | H.264 deblocking operation. A 4 × 4 × 8 (VERTICL filter) or a 8 × 4 × 8 block is provided from Texture Cache 166. |
| SAMPLE_IDF_H264_1 | SAMPLE_IDF_H264_1 DST, SRC2, SRC1 | H.264 operation. One 4 × 4 × 8-bit block is provided from the shader, the other 4 × 4 × 8-bit block is provided from the Texture Cache 166. This allows the 8 × 4 (or 4 × 8) block to be constructed. |
| SAMPLE_IDF_H264_2 | SAMPLE_IDF_H264_2 DST, #ctrl, SRC2, SRC1 | H.264 deblocking operation. Both the 4 × 4 blocks are provided by the shader, constructing the 8 × 4 block. |
| SAMPLE_SAD | SAMPLE_SAD DST, S#, T#, SRC2, SRC1 | Four sum of absolute difference (SAD) operations are performed on the reference (SRC2) and prediction data. |
| SAMPLE_TCF_I4×4 | SAMPLE_TCF_I4×4 DST, #ctrl, SRC2, SRC1 | Transform Coding implementations |
| SAMPLE_TCF_M4×4 | SAMPLE_TCFM4×4 DST, #ctrl, SRC2, SRC1 | Transform Coding implementations |
| SAMPLE_TCF_MPEG2 | SAMPLE_TCF_MPEG2 DST, #ctrl, SRC2, SRC1 | Transform Coding implementations |
| SAMPLE_MADD | SAMPLE_MADD DST, #ctrl, SRCW, SRC1 | See below |
| SAMPLE_SIMMUL | SAMPLE_SIMMUL DST, #ctrl, SRC2, SRC1 | A scalar-matrix multiply is performed. The #ctrl is an 11-bit immediate value. This may be 0 (e.g., the #ctrl signals will be ignored). Also, see below |

Additionally, with respect to SAMPLE_MADD, the #ctrl may be an 11-bit immediate value. Further, the addition of two 4×4 matrices (SRC1 and SRC2) is performed. One or more elements of either matrix may be 16-bit signed integers. The result (DST) is a 4×4 16-bit matrix. The matrices may be laid out in the source/destination registers as shown below in Table 11. This may be a separate unit within the VPU. Additionally, the SRC1 and the #ctrl data will be made available on cycle 1 and then SRC2 in the following cycle. Thus the operation can be issued once every two cycles.

ctrl[0] indicates whether a saturation is to be performed.
ctrl[1] indicates whether a rounding is to be performed.
ctrl[2] indicates whether a 1-bit right-shift is to be performed.
ctrl[10:3] is ignored.

TABLE 11

Registers for source and destination matrices

| 255:240 | 239:224 | 223:208 | 207:192 | | | | | | | | | 63:48 | 47:32 | 31:16 | 15:0 |
|---|---|---|---|---|---|---|---|---|---|---|---|---|---|---|---|
| M33 | M32 | M31 | M30 | M23 | M22 | M21 | M20 | M13 | M12 | M11 | M10 | M03 | M02 | M01 | M00 |

Additionally, logic associated with this data may include the following:

```
#Lanes := 16; #Lanewidth := 16;
If (#ctrl[1]) R = 1; ELSE R = 0;
If (#ctrl[2]) S = 1; ELSE S = 0;
IF (#ctrl[0]) SAT = 1; ELSE SAT = 0;
For (I := 0; I < #Lanes; I += 1){
    Base := I * #Lanewidth;
    Top := Base + #Lanewidth - 1;
    Source1[I] := SRC1[Top..Base];
    Source2[I] := SRC2[Top..Base];
    Destination[I] := (Source1[I] + Source2[I] + R) >> S;
    IF (SAT) Destination[I] = MIN(MAX(Destination[I],0),255);
    DST[Top..Base] = Destination[I];
```

Referring back to FIG. 9, a scalar-matrix multiply is performed. The #ctrl is an 11-bit immediate value. This value may be 0, (e.g., the #ctrl signals will be ignored). This instruction is in same group as SAMPLE_TCF and SAMPLE_IDF_H264_2. Logic associated with this instruction may include the following:

```
#Lanes := 16; #Lanewidth := 16;
MMODE = Control_4[17:16];
SM = Control_4[7:0];
SP = Control_4[15:8]; //only least significant 5-bit used
For (I := 0; I < #Lanes; I += 1){
    Base := I * #Lanewidth;
    Top := Base + #Lanewidth - 1;
    Source2[I] := SRC2[Top..Base];
    Destination[I] := (SM * Source2[I]) >> SP;
    DST[Top..Base] = Destination[I];}
```

This is implemented using the FIR_FILTER_BLOCK unit for the MCF/TCF in the VPU. SM is the weight which is applied to all the lanes, e.g., W[0]=W[1]=W[2]=W[3]=SM. Pshift is SP. When this operation is performed, the sum adder in the FIR_FILTER_BLOCK is bypassed and the four results from the 16×8-bit multiply can be shifted and the least-significant 16-bit of each result is gather together back into 16 16-bit results for passing back to the EU.

FIG. 3 is an exemplary embodiment of a flow diagram illustrating a process for processing video data, such as in the computing architecture from FIG. 2. More specifically, as illustrated in the nonlimiting example of FIG. 3, command stream processor 120 can send data and instructions to EUP 146. EUP 146 may be configured to read the instructions and process the received data accordingly. EUP 146 can then send the instructions and processed data, as well as data from EUP Texture Address Generator (TAG) interface 242, to Texture Address Generator (TAG) 150. TAG 150 may be configured to generate an address for the processed data. TAG 150 can then send the data and instructions to Texture Cache Controller (TCC) 166. TCC 166 may be configured to cache the received data for Texture Filter Unit (TFU) 168. TFU 168 can filter the received data according to the received instructions and send the filtered data to Video Programmable Units (VPU) 199. VPU 199 can process the received data according to the received instructions and send the processed data to postpacker (PSP) 160. PSP 160 can collect pixel packets from various components such as the TFU 168. If tiles are partially full, the PSP 160 may pack a plurality of files and send the tiles back to the EUP 146 using a specific identifier, which has been sent down the pipeline.

Figure 4A:
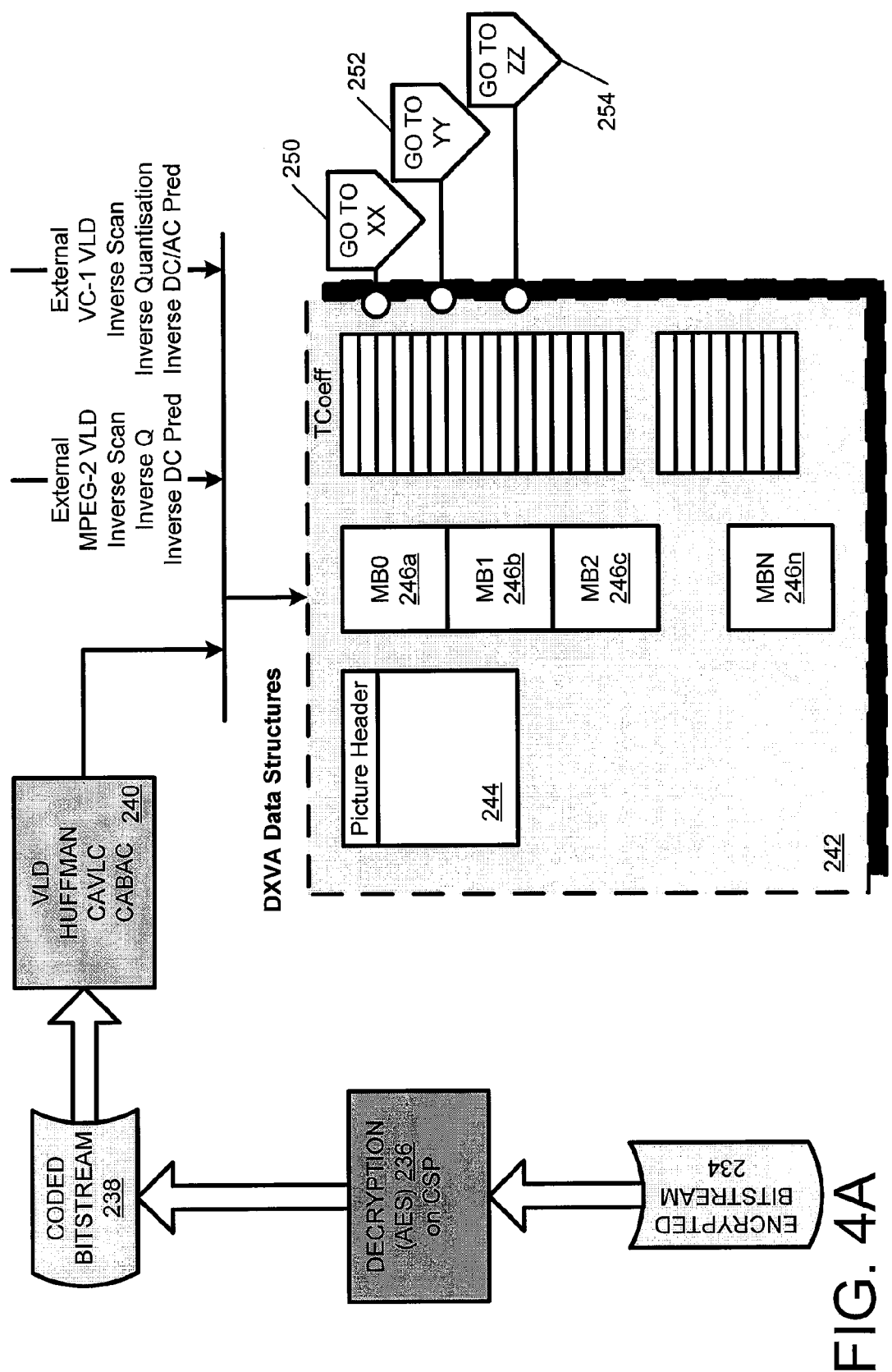
FIG. 4A is an exemplary embodiment of a functional flow diagram illustrating data flow in a computing device, such as a computing device with the computing architecture from FIG. 2.

FIG. 4A is an exemplary embodiment of a functional flow diagram illustrating data flow in a computing device, such as a computing device with the computing architecture from FIG. 2. As illustrated in the nonlimiting example of FIG. 4A, an encrypted data stream 234 may be sent to a decryption component 236 on CSP 120, 128. In at least one embodiment, an encrypted bit stream 234 may be decrypted and written back to video memory. The decrypted video may then be decoded using Variable Length Decoder (VLD) hardware. Decryption component 236 can decrypt the received bitstream 234 to create a coded bitstream 238. The coded bitstream 238 can be sent to a VLD, Huffman decoder, Complex Adaptive Variable Length Coder (CAVLC), and/or a Context Based Binary Arithmetic Coder (CABAC) 240 (referred to herein as "decoder 240"). Decoder 240 decodes the received bitstream 238 and sends the decoded bitstream to DirectX Video Acceleration (DXVA) data structures 242. Additionally received at DXVA data structures 242 is an external MPEG-2 VLD Inverse Scan, Inverse Quantization, and Inverse DC Pred and an External VC-1 VLD Inverse Scan, Inverse Quantization, and Inverse DC/AC Pred. This data can then be captured in DXVA data structures 242 via a picture header 244, Memory Buffer 0 (MB0) 246a, MB1 246b, MB2 246c, ..., MBN 246n. The data can then proceed to jump blocks 250, 252, and 254, continued in FIGS. 4B and 4C.

Figure 4B:
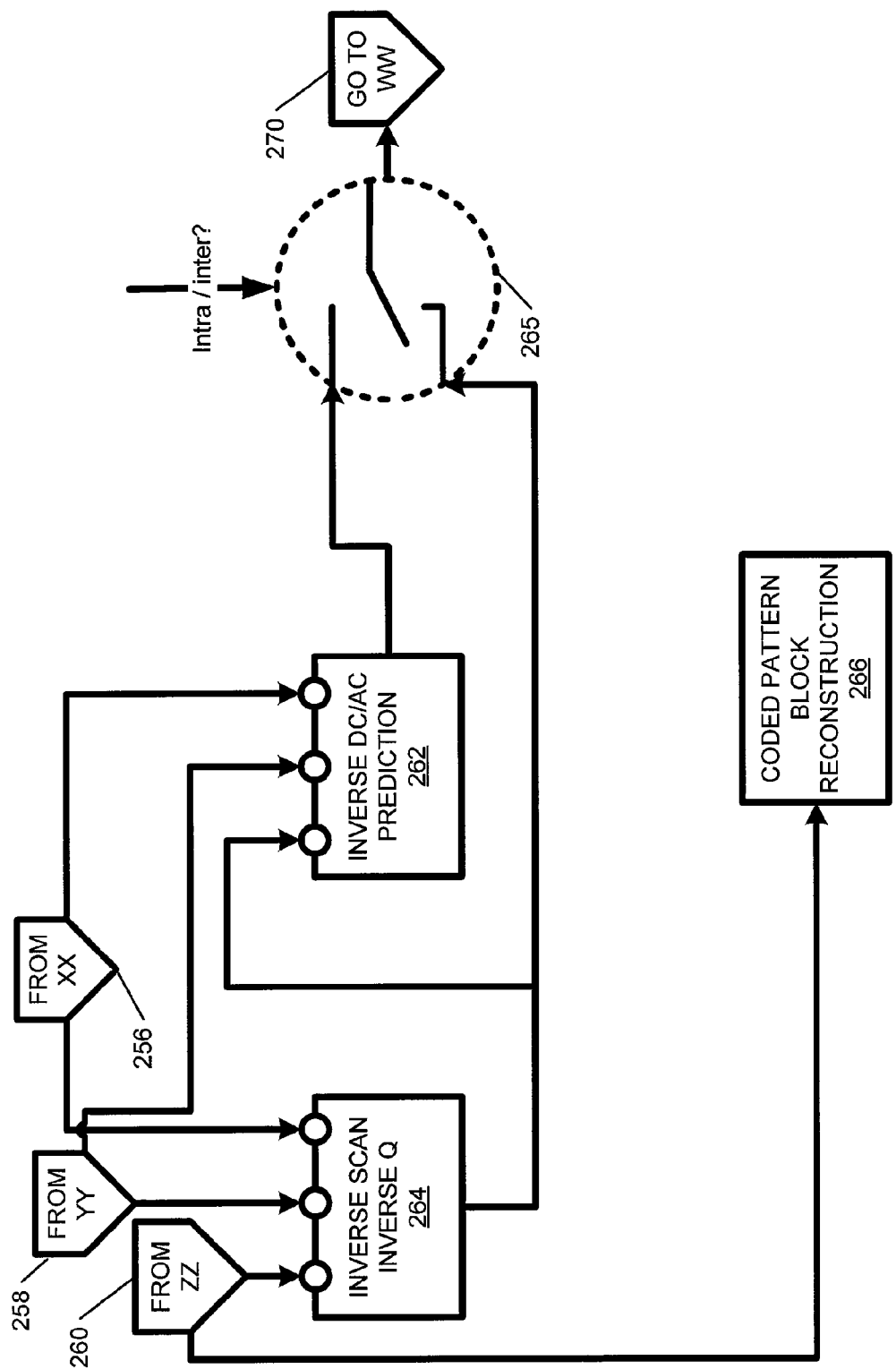
FIG. 4B is a continuation of the functional flow diagram from FIG. 4A.

FIG. 4B is a continuation of the functional flow diagram from FIG. 4A. As illustrated, from jump blocks 250, 252, and 254 in FIG. 4A, data is received at inverse scan inverse Q component 264 and inverse DC/AC prediction component 262. This data is processed and sent to switch 265. Switch 265 determines data to send via Intra/Inter input. The selected data is sent to jump block 270. Additionally, data from jump block 260 is sent to coded pattern block reconstruction component 266.

Figure 4C:
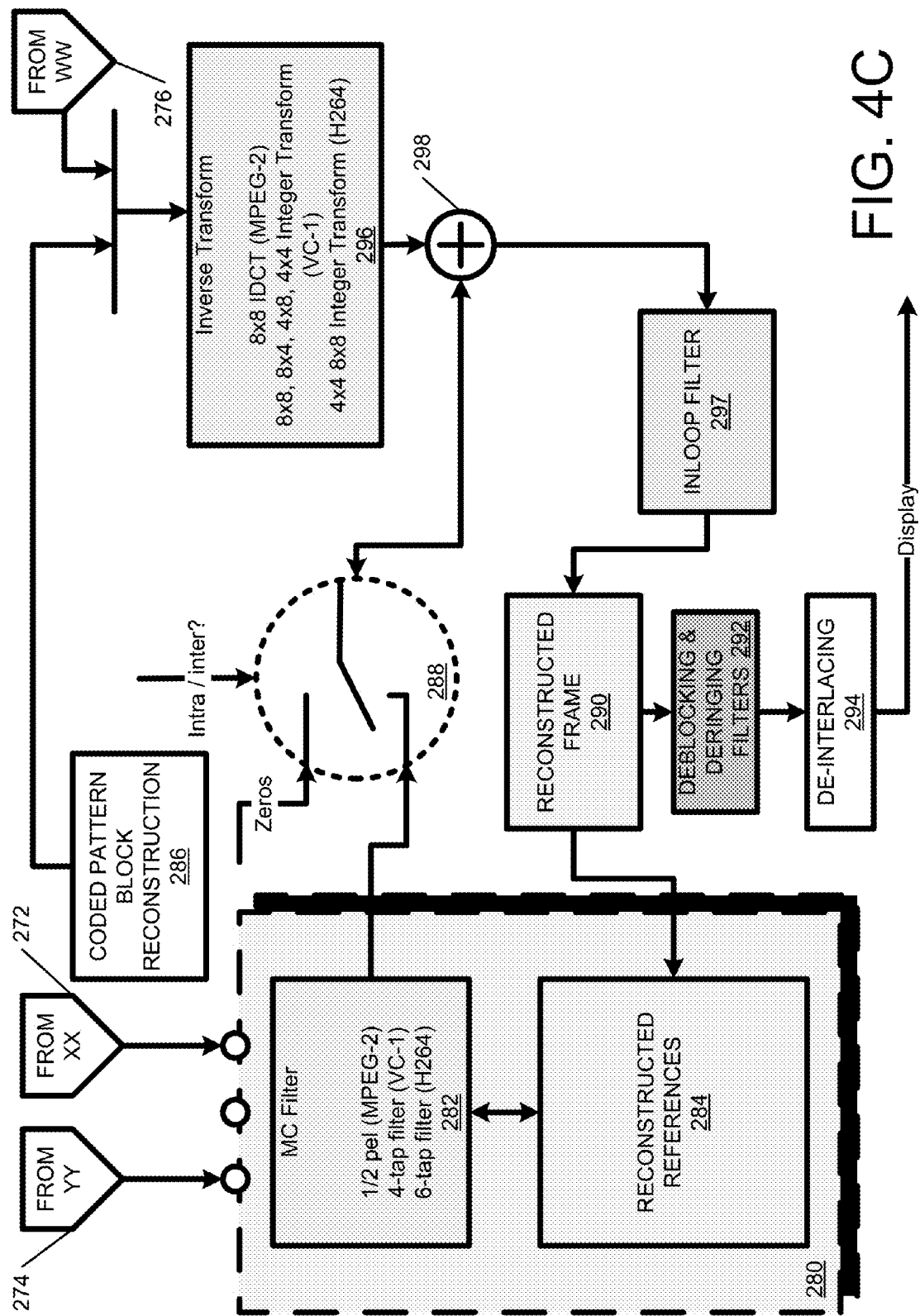
FIG. 4C is a continuation of the functional flow diagrams from FIGS. 4A and 4B.

FIG. 4C is a continuation of the functional flow diagram from FIGS. 4A and 4B. As illustrated, data from jump blocks 272, 274 (FIG. 4C) is received at filter component 280. This data is filtered by MC filter 282 according to any of a plurality of protocols. More specifically, if the data is received in an MPEG-2 format, the data is constructed at ½ pixel deviations. If the data is received in a VC-1 format, a 4-tap filter is utilized. If, on the other hand, the data is received in an H.264 format, a 6-tap filter may be utilized. The filtered data is then sent to reconstructed references component 284 for reconstruction. Data associated with filter component 280 is sent to switch component 288. Switch component also receives zeros. Switch component can determine which data to send to adder 298, based on received Intra/Inter data.

Additionally, inverse transform component 296 receives data from coded pattern block reconstruction 286, as well as data from switch 265 (FIG. 4B) via jump block 276. Inverse transform component 296 performs an 8×8 Inverse Discrete Cosine Transform (IDCT) for MPEG-2 data, an 8×8, 8×4, 4×8, and/or a 4×4 Integer Transform for VC-1 data, and a 4×4 Integer Transform for H.264 data. Upon executing the desired transform, this data is sent to adder 298.

Adder sums the data received from inverse transform component 296 and switch 288 and sends the summed data to inloop filter 297. Inloop filter 297 filters the received data and sends the filtered data to reconstructed frame component 290. Reconstructed frame component 290 sends data to reconstructed references component 284. Reconstructed frame component 290 can send data to deblocking and deringing filters 292, which can send filtered data to de-interlacing component 294 for de-interlacing. This data can then be provided for display.

Figure 5A:
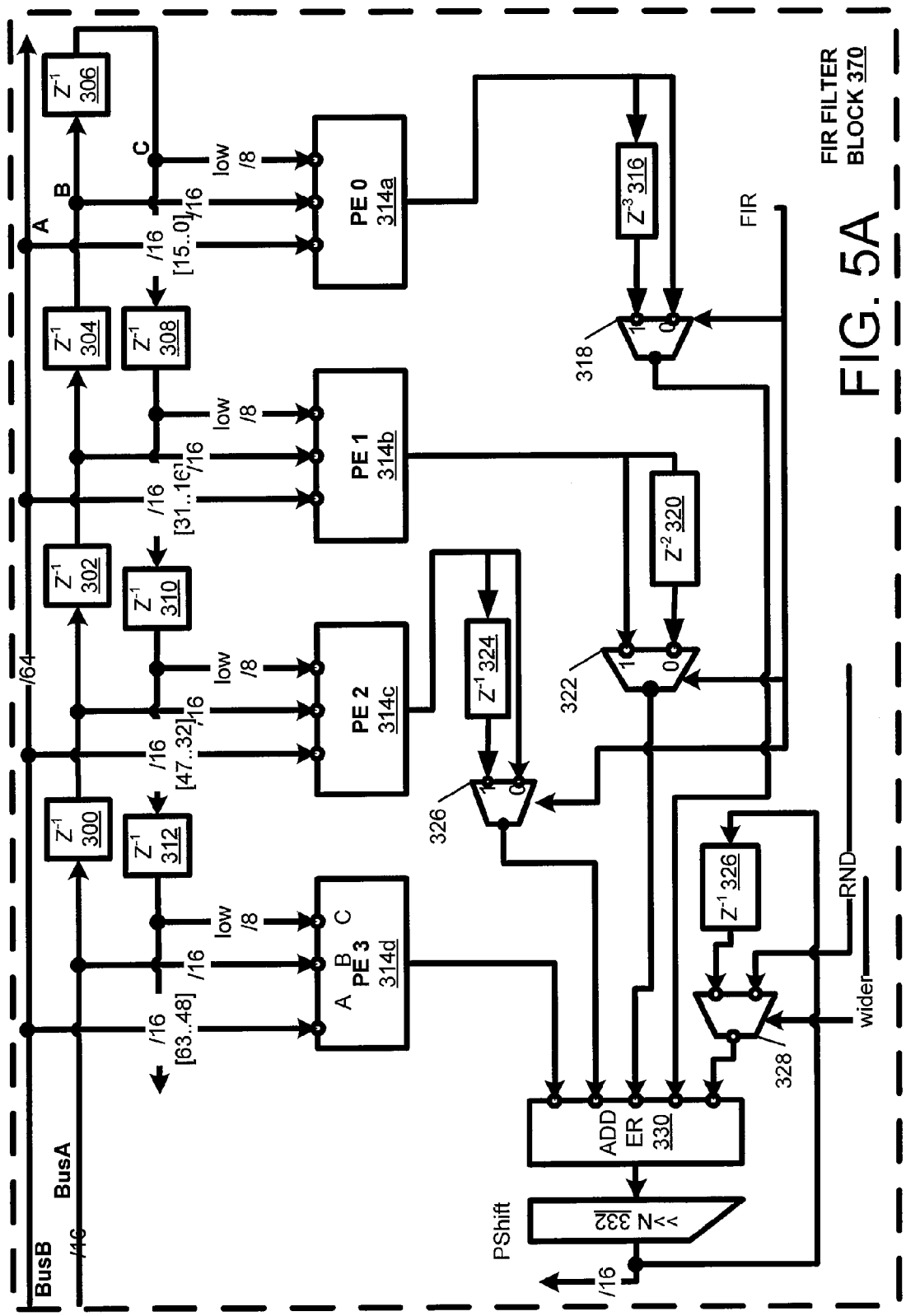
FIG. 5A is a functional block diagram illustrating an exemplary embodiments embodiment of components that may be utilized for providing motion compression (MC) and/or Discrete Cosine Transform (DCT) operations, such as in the computing architecture from FIG. 2.

FIG. 5A is a functional block diagram illustrating an exemplary embodiment of components that may be utilized for providing motion compression (MC) and/or Discrete Cosine Transform (DCT) operations in a VPU, such as in the computing architecture from FIG. 2. More specifically, as illustrated in the nonlimiting example of FIG. 5A, bus A may be configured to send 16-bit data to input port b of PE 3 314$d$. Bus A also sends data to $Z^{-1}$ delay component 300 for sending 16-bit data to the second input of PE 2 314$c$. Bus A also sends this data to $Z^{-1}$ delay 302 to send 16-bit data to PE 1 314$b$. This data is also sent to $Z^{-1}$ delay 304, which then proceeds to PE 0 314$a$, as well as $Z^{-1}$ delay 306. After traversing the $Z^{-1}$ delay 306, the low 8-bit data from bus A is sent to PE 0 314$a$. This data is delayed by $Z^{-1}$ 306 and sent to PE 1 314$b$, as well as $Z^{-1}$ delay component 310. After reaching $Z^{-1}$ delay component 310, the low 8-bits of this data is sent to PE 2 314$c$, as well as $Z^{-1}$ delay component 312. After reaching $Z^{-1}$ delay component 312, the low 8-bits of this data is sent to PE 3 314$d$. Additionally, bus B sends 64 bit data to each of PE 3 314$d$, PE 2 314$c$, PE 1 314$b$, and PE 0 314$a$.

Processing Element 0 (PE 0) 314$a$ may facilitate filtering of received data. More specifically, a PE may be an element of an FIR filter. When PE 0 314$a$, PE 1 314$b$, PE 2 314$c$, and PE 3 314$d$ are combined with the adder 330, this may form a 4-tap/8-tap FIR filter. A portion of the data is first sent to $Z^{-3}$ delay component 316. Multiplexor 318 selects data to output from Field Input Response (FIR) input data into select port of multiplexor 318. From multiplexor 318, this data is sent to adder 330.

Similarly, data from PE 1 314$b$ is sent to multiplexor 322, some of which is first received at $Z^{-2}$ delay component 320. Multiplexor 322 selects from the received data via received FIR input. The selected data is sent to adder 330. Data from PE 2 314$c$ is sent to multiplexor 326, some of which is first sent to $Z^{-1}$ delay component 324. FIR input selects the data to be sent to adder 330. Data from PE 3 314$d$ is sent to adder 330.

Also input to adder is a feedback loop from N shifter 332. This data is received at multiplexor 328 via $Z^{-1}$ delay component 326. Also received at multiplexor 328 is round data. Multiplexor 328 selects from the received data via wider input at a select port of multiplexor 328. Multiplexor 328 sends the selected data to adder 330. Adder 330 adds the received data and sends the added data to N shifter 332. The 16-bit shifted data is sent to output.

Figure 5B:
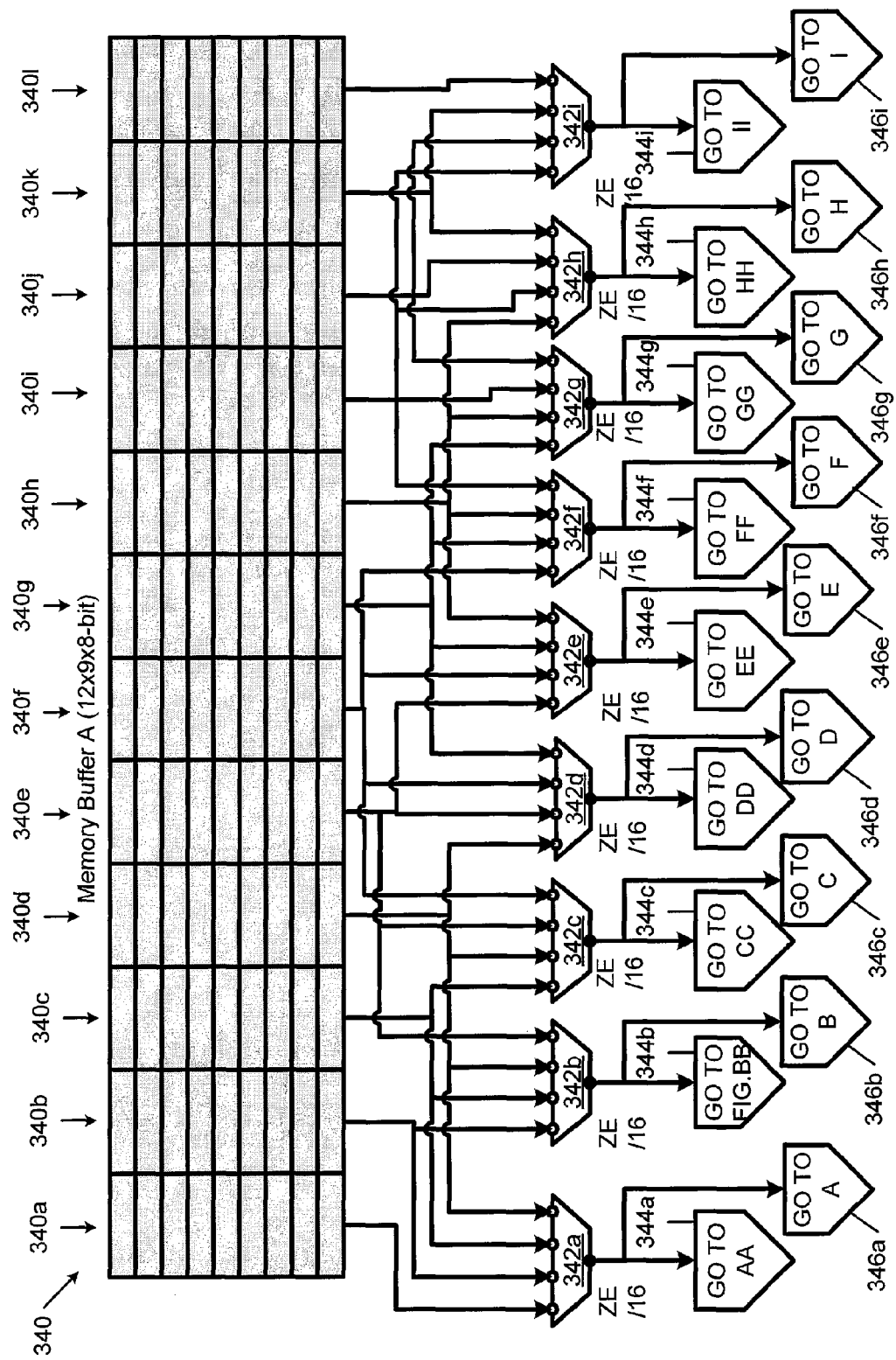
FIG. 5B is a continuation of the diagram from FIG. 5A.

FIG. 5B is a continuation of the diagram from FIG. 5A. More specifically, as illustrated in the nonlimiting example of FIG. 5B, data from memory buffers 340$a$, 340$b$, 340$c$, and 340$d$ are sent to multiplexor 342$a$. Multiplexor 342$a$ sends 16-bit data to jump blocks 344$a$ and 346$a$. Similarly, multiplexor 342$b$ receives data from memory buffers 340$b$, 340$c$, 340$d$, and 340$e$ and sends data to jump block 344$b$ and 346$b$. Multiplexor 342$c$ receives data from 340$c$, 340$d$, 340$e$, and 340$f$ and sends data to 344$c$ and 346$c$. Multiplexor 342$d$ receives data from 340$d$, 340$e$, 340$f$, and 340$g$ and sends data to jump blocks 344$d$ and 346$d$. Multiplexor 342$e$ receives data from 340$e$, 340$f$, 340$g$, and 340$h$ and sends data to 344$e$ and 346$e$. Multiplexor 342$f$ receives data from 340$f$, 340$g$, 340$h$, and 340$i$ and sends data to 344$f$ and 346$f$. Multiplexor 342$g$ receives data from 340$g$, 340$h$, 340$i$, and 340$j$ and sends data to jump blocks 344$g$ and 346$g$. Multiplexor 342$h$ receives data from 340$h$, 340$i$, 340$j$, and 340$k$ and sends data to 344$h$ and 346$h$. Multiplexor 342$i$ receives data from 340$i$, 340$j$, 340$k$ and 340$l$ and sends data to jump blocks 344$i$ and 346$i$.

Figure 5C:
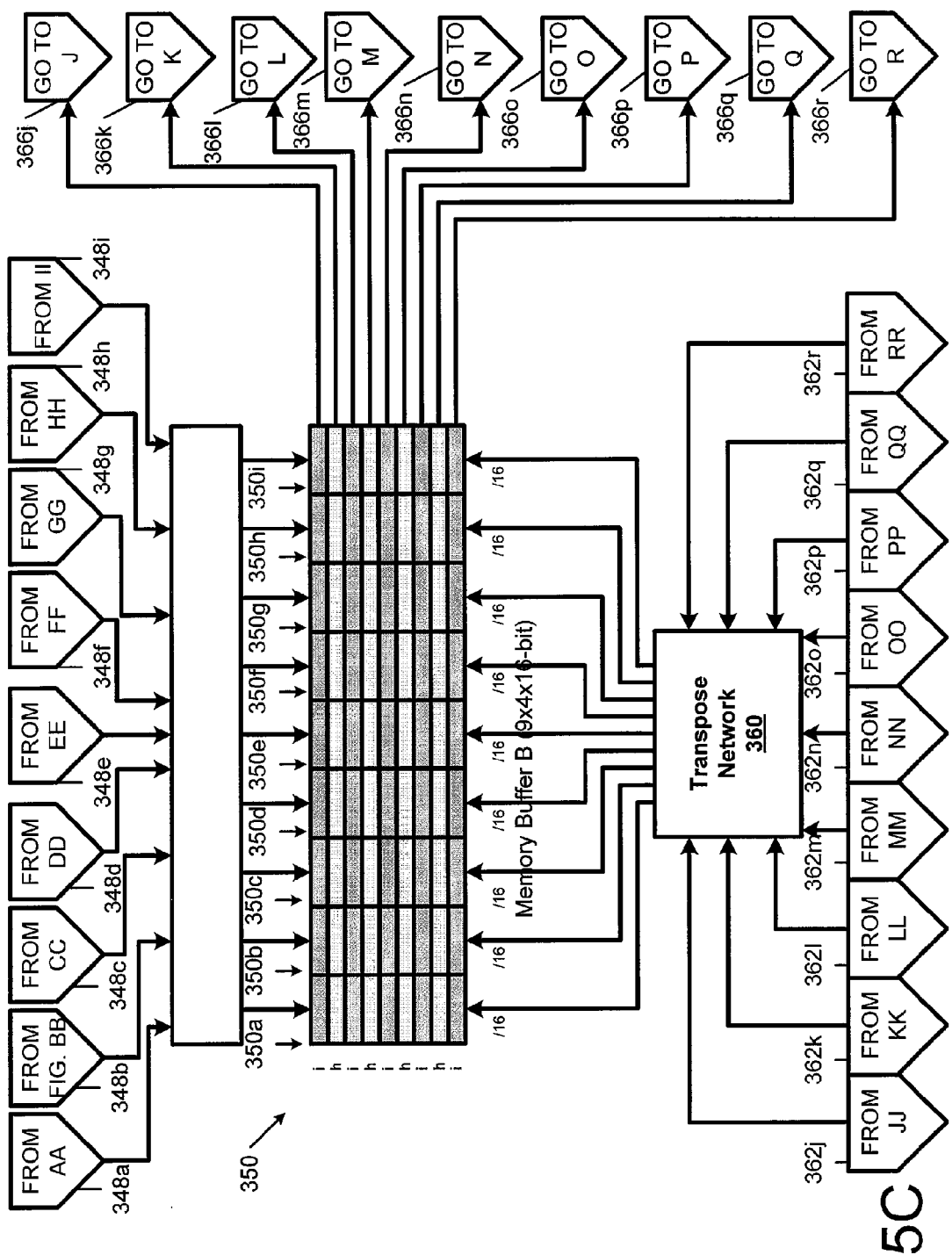
FIG. 5C is a continuation of the diagrams from FIGS. 5A and 5B.

FIG. 5C is a continuation of the diagram from FIGS. 5A and 5B. More specifically, data from multiplexor 342$a$ (via jump block 348$a$) is sent to memory buffer B, slot 350$a$. Data from multiplexor 342$b$ (via jump block 348$b$) is sent to memory B, slot 350$b$. Data from multiplexor 342$c$ (via jump block 348$c$) is sent to memory B, slot 350$c$. Data from multiplexor 342$d$ (via jump block 348$d$) is sent to memory B, slot 350$d$. Data from multiplexor 342$e$ (via jump block 348$e$) is sent to memory B, slot 350$e$. Data from multiplexor 342$f$ (via jump block 348$f$) is sent to memory B, slot 350$f$. Data from multiplexor 342$g$ (via jump block 348$g$) is sent to memory B, slot 350$g$. Data from multiplexor 342$h$ (via jump block 348$h$) is sent to memory B, slot 350$h$. Data from multiplexor 342$i$ (via jump block 348$i$) is sent to memory B, slot 350$i$.

Similarly data from jump blocks 362$j$-362$r$ (from FIG. 5D, discussed below) is sent to transpose network 360. Transpose network 360 transposes the received data and sends to memory buffer B. Data from memory buffer B is sent to jump blocks 366$j$-366$r$.

Figure 5D:
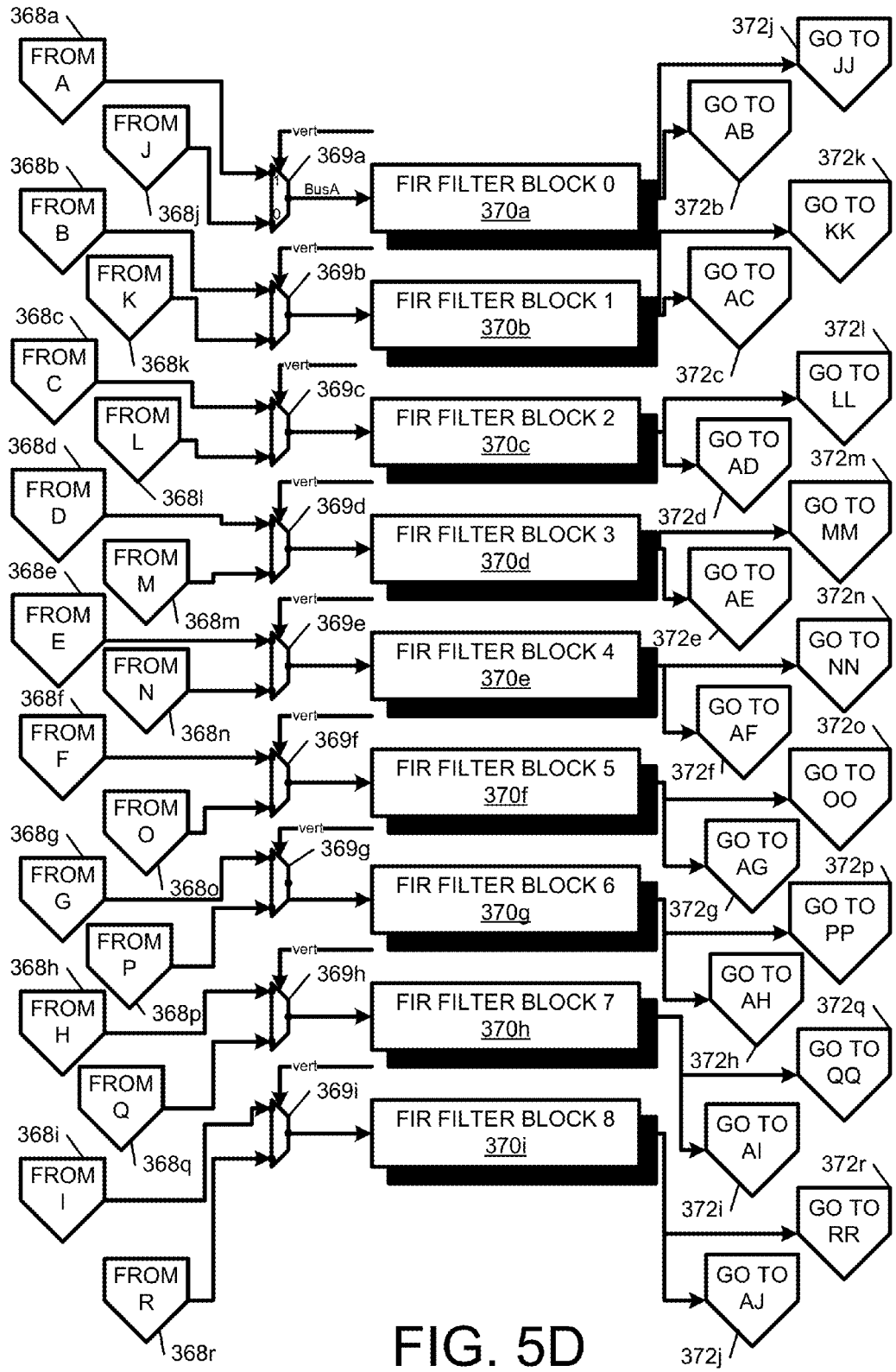
FIG. 5D is a continuation of the diagrams from FIGS. 5A-5C.

FIG. 5D is a continuation of the diagrams from FIGS. 5A-5C. More specifically, data is received from jump block 368$a$ (FIG. 5B, via multiplexor 342$a$) and jump block 368$j$ (FIG. 5C, via memory buffer B) at multiplexor 369$a$, this data is selected by vert signal and sent to FIR filter block 0 370$a$, via bus A (see FIG. 5A). Similarly, multiplexors 369$b$-369$i$ receive data from jump blocks 368$b$-368$l$ and 368$k$-368$r$. This data is sent to FIR filter blocks 370$b$-370$i$ and is processed, as discussed with regard to FIG. 5A. Data output from FIR filter block 0 370$a$ is sent to jump blocks 372$b$ and 372$j$. FIR filter block 370$b$ outputs to jump block 372$c$ and 372$k$. FIR filter block 370$c$ outputs to jump block 372$d$ and 372$l$. FIR filter block 370$d$ outputs to jump block 372$e$ and 372$m$. FIR filter block 370$e$ outputs to jump block 372$f$ and 372$n$. FIR filter block 370$f$ outputs to jump block 372$g$ and 372$o$. FIR filter block 370$g$ outputs to jump block 372$h$ and 372$p$. FIR filter block 370$h$ outputs to jump block 372$i$ and 372$q$. FIR filter block 370$i$ outputs to jump block 372$j$ and 372$r$. As discussed above, data from jump blocks 372$j$-372$r$ are received by transpose network 360 from FIG. 5C. Jump blocks 372$b$-372$j$ are continued in FIG. 5E.

Figure 5E:
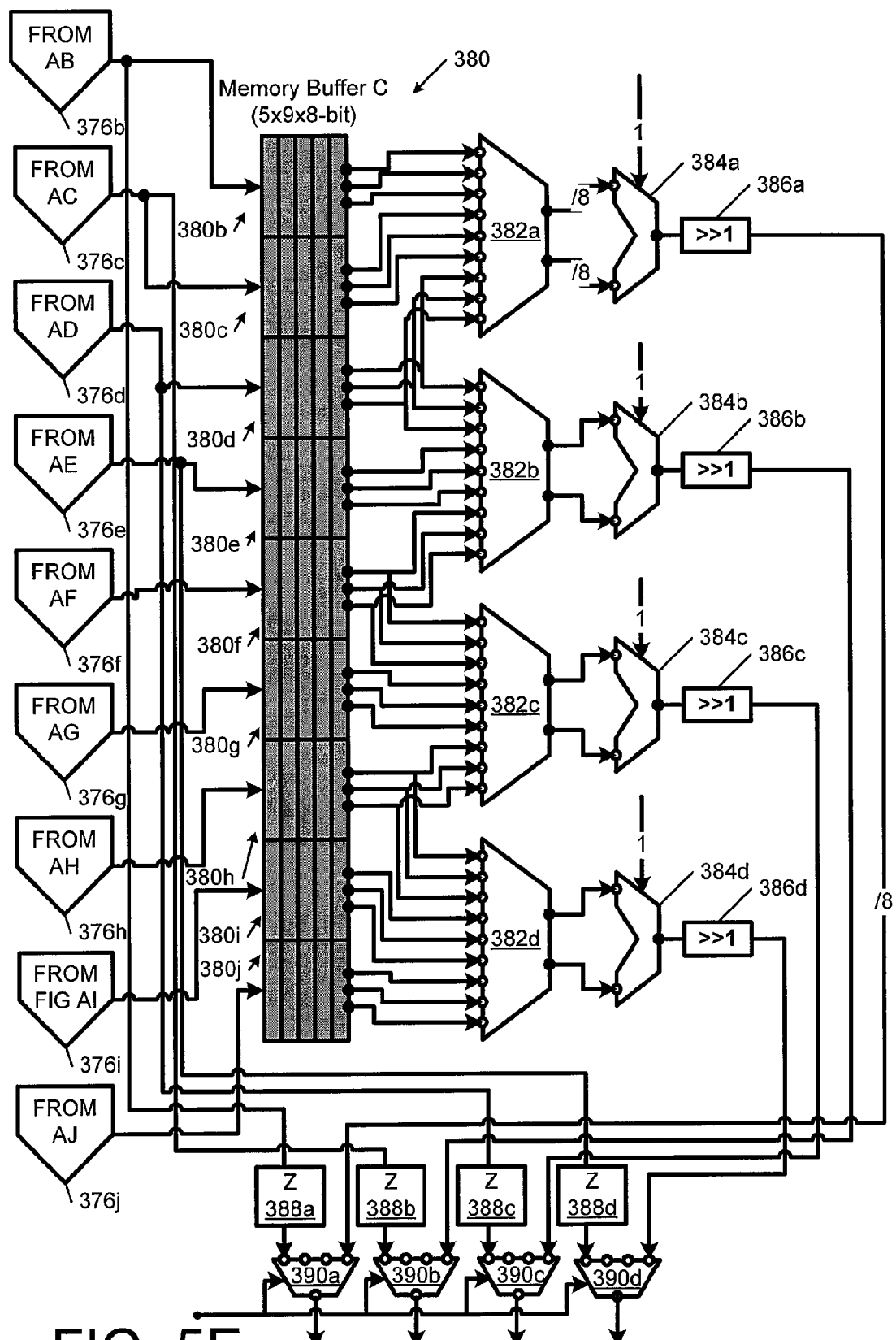
FIG. 5E is a continuation of the diagrams from FIGS. 5A-5D.

FIG. 5E is a continuation of the diagrams from FIGS. 5A-5D. More specifically, as illustrated in the nonlimiting example of FIG. 5E, data from jump block 376b (via FIR filter block 370a from FIG. 5D) is sent to memory buffer C, slot 380b. Similarly, data from jump block 376c (via FIR filter block 370b from FIG. 5D) is sent to memory buffer C, slot 380c. Data from jump block 376d (via FIR filter block 370c from FIG. 5D) is sent to memory buffer C, slot 380d. Data from jump block 376e (via FIR filter block 370d from FIG. 5D) is sent to memory buffer C, slot 380d. Data from jump block 376f (via FIR filter block 370d from FIG. 5D) is sent to memory buffer C, slot 380f. Data from jump block 376g (via FIR filter block 370f from FIG. 5D) is sent to memory buffer C, slot 380g. Data from jump block 376h (via FIR filter block 370g from FIG. 5D) is sent to memory buffer C, slot 380h. Data from jump block 376i (via FIR filter block 370h from FIG. 5D) is sent to memory buffer C, slot 380i. Data from jump block 376j (via FIR filter block 370i from FIG. 5D) is sent to memory buffer C, slot 380j.

Multiplexor 382a receives data from memory buffer C, slots 380b, 380c, and 380d. Multiplexor 382b receives data from memory buffer C, slots 380d, 380e, and 380f. Multiplexor 382c receives data from memory buffer C, slots 380f, 380g, and 380h. Multiplexor 382d receives data from memory buffer C, slots 380h, 380i, and 380j. Upon receiving data, multiplexors 382a-382d sends data to ALU 384a-384d. ALUs 384a-384d receive this data, as well as a value of "1," processes the received data, and sends the processed data to shifter 386a-386d, respectively. Shifters 386a-386d shift the received data and send the shifted data to Z blocks 388a-388d. From Z blocks 388a-388d, the data is sent to multiplexors 390a-390d, respectively.

Additionally, Z block 388 receives data from jump block 376c and sends the data to multiplexor 390a. Z block 388b receives data from jump block 376d and sends that data to multiplexor 390b. Z block 388c receives data from jump block 376d and sends data to multiplexor 390c. Z block 388d receives data from 376e and sends data to multiplexor 390d. Multiplexors 390a-390d also receive select input and send the selected data to output.

Figure 5F:
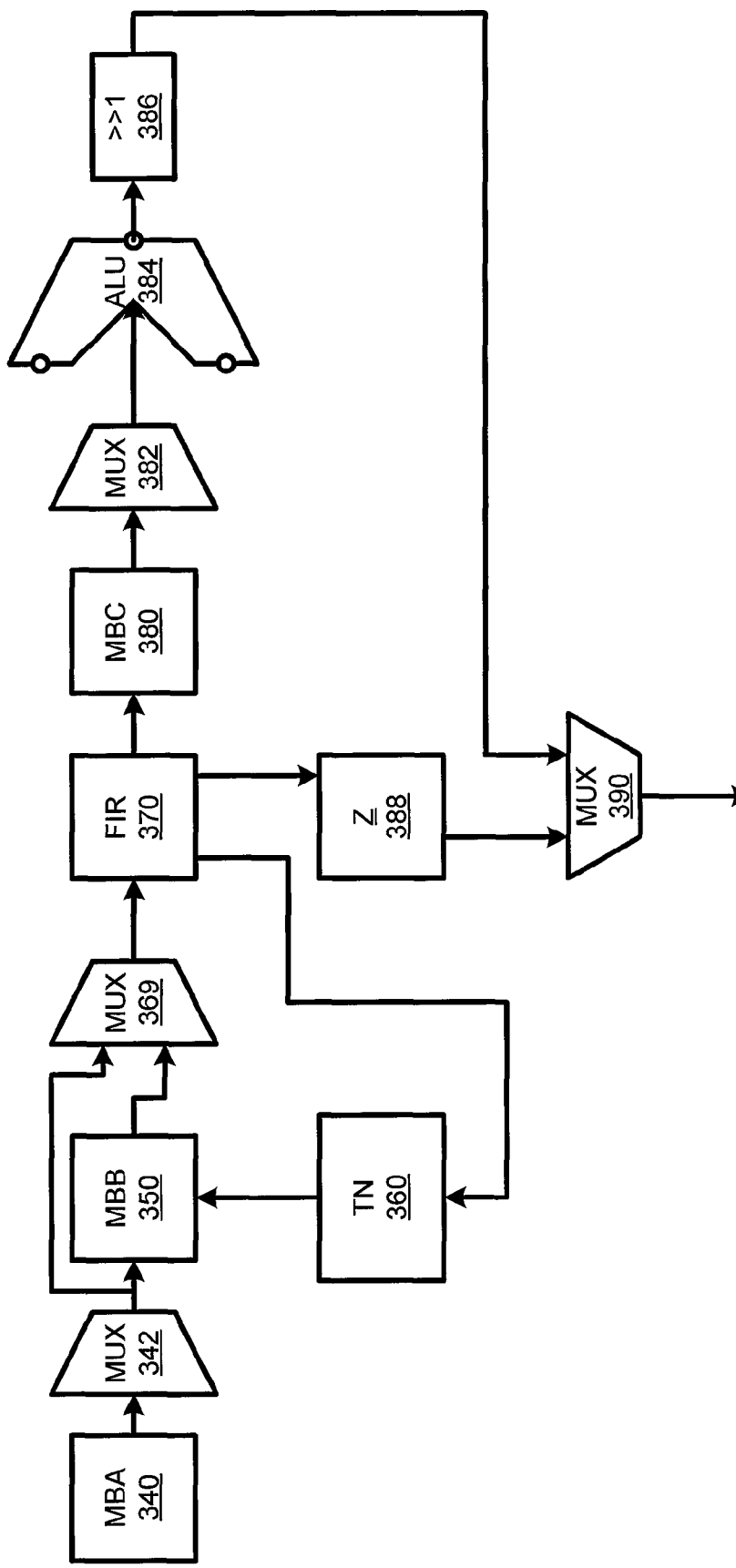
FIG. 5F is an exemplary embodiment of an overall diagram of the components of FIGS. 5A-5E.

FIG. 5F is an exemplary embodiment of an overall diagram of the components of FIGS. 5A-5E. More specifically, as illustrated in the nonlimiting example of FIG. 5F, data is received at memory buffer A 340. This data is multiplexed with other data in memory buffer A 340 at multiplexor 342. Multiplexor selects data and sends the selected data to memory buffer b 350. Memory buffer also receives data from Transport Network 360. Memory buffer sends data to multiplexor 369, which also receives data from multiplexor 342. Multiplexor 369 selects data and sends the selected data to FIR filter 370. FIR filter 370 filters the received data and sends the filtered data to memory buffer C 380, Z component 388, and transport network 360. Memory buffer C 380 sends data to multiplexor 380, which selects from the data received from memory buffer 382. The selected data is sent to ALU 384, which computes a result from the received data and sends the computed data to sifter 386. The shifted data is sent to multiplexor 390, which also receives data from z component 388. Multiplexor selects a result and sends the result to output.

The components illustrated in FIGS. 5A-5F may be configured to provide Motion Compression (MC) and/or Discrete Cosine Transform (DCT). More specifically, depending on the particular embodiment and/or the format of data, the data may traverse the components of FIGS. 5A-5F a plurality of times in a recursive operation to achieve the desired result. Additionally, depending on the particular operation and particular data format, data may be received from the EU 146 and/or the TFU 168.

As a nonlimiting example, in operation, the components of FIGS. 5A-5F may be configured to receive an indication regarding the desired operation to be performed (e.g., Motion Compensation, Discrete Cosine Transform, etc.). Additionally, an indication may be received regarding the format of the data (e.g., H.264, VC-1, MPEG-2, etc.). As a nonlimiting example, for H.264 Motion Compensation (MC) data may traverse through FIR filter 370 in a plurality of cycles and then to memory buffer 380 for conversion to a ¼ pixel format. As discussed in more detail below, other operations with H.264 or other data may utilize the same or a different utilization of the components of FIGS. 5A-5F. In addition, the multiplier array can be configured to be used as an array of multiplier to perform 16 16-bit multiplies, and/or vector or matrix multipliers. An example of this is the SMMUL instruction.

Figure 6:
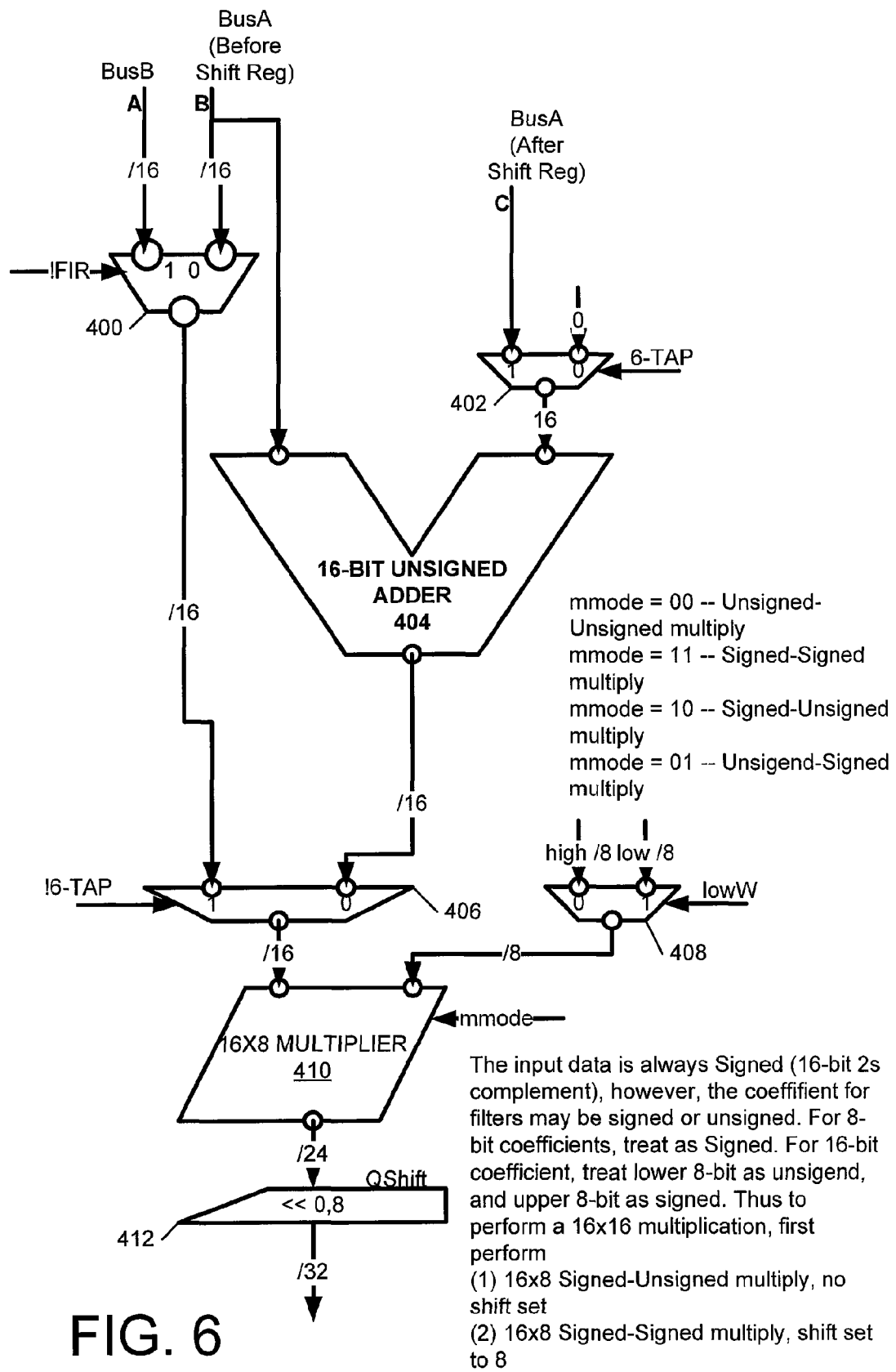
FIG. 6 is a functional block diagram illustrating a Pixel Processing Engine that may be utilized in a computing architecture, such as the computing architecture from FIG. 2.

FIG. 6 is a functional block diagram illustrating a Pixel Processing Engine that may be utilized in a computing architecture, such as the computing architecture from FIG. 2. More specifically, as illustrated in the nonlimiting example of FIG. 6, bus A (before shift register) and Bus B (see FIG. 5A) send 16-bit data to multiplexor 400. Received at the select port of multiplexor 400 is a negated signal from FIR filter 370. Multiplexor may be configured to select 16-bit data and send the data to multiplexor 406. Additionally, multiplexor 402 may be configured to receive bus A data (after shift register) and zero data. Multiplexor 402 may select a desired result from a 6-tap data at select port. The 16-bit result may be sent to 16-bit unsigned adder 404. 16-bit unsigned adder 404 may also be configured to receive data from bus A (before shift register).

16-bit unsigned adder 404 can add the received data and send the result to multiplexor 406. Multiplexor 406 may be configured to select from the received via inverted 6-tap data received at select port. The selected data may be sent to 16×8 multiplier 410, which may also receive mode data. A 24-bit result may then be sent to shifter 412 to provide a 32-bit result.

Figure 7A:
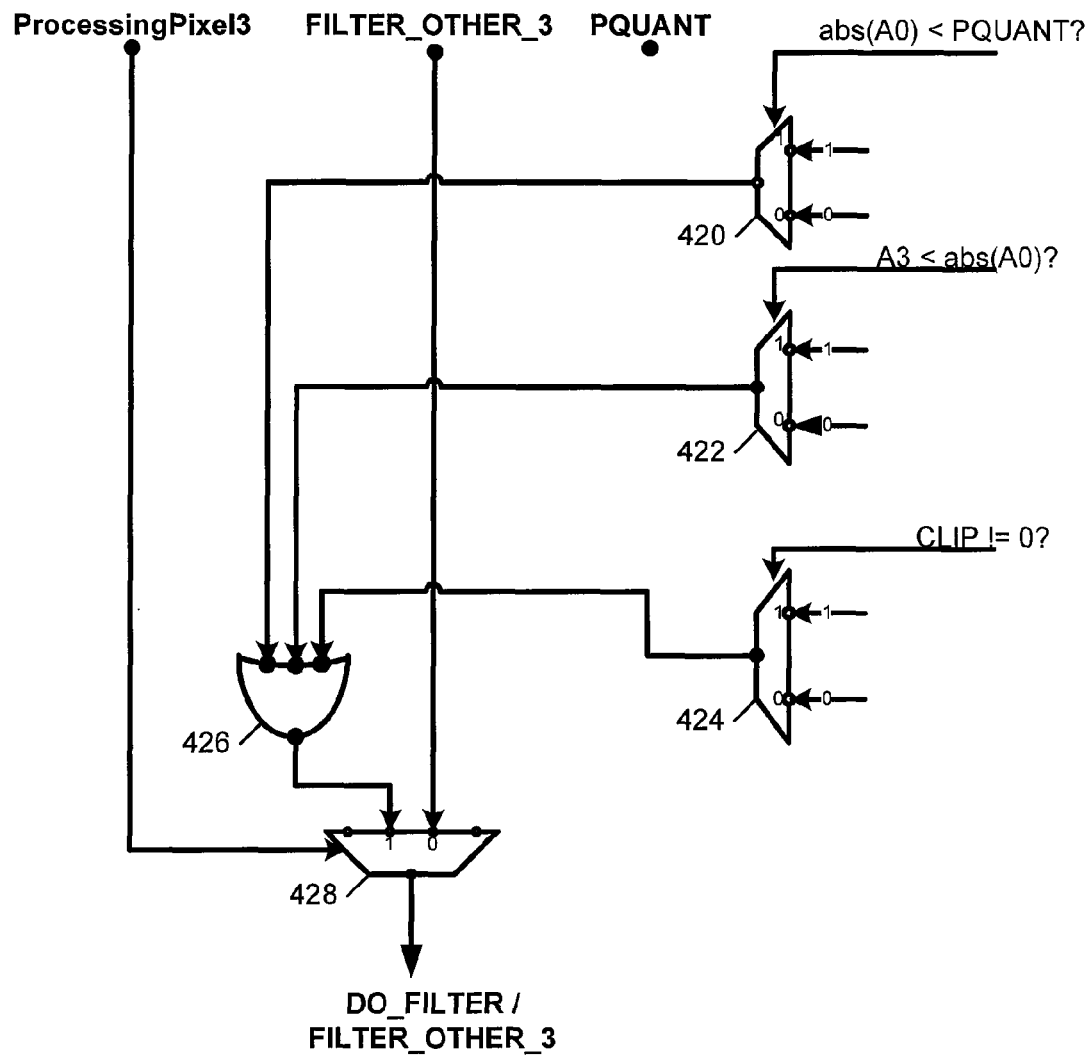
FIG. 7A is a functional block diagram illustrating exemplary components that may be utilized in a VC-1 in-loop filter, such as in the computing architecture from FIG. 2.

FIG. 7A is a functional block diagram illustrating exemplary components that may be utilized in a VC-1 in-loop filter, such as in the computing architecture from FIG. 2. As illustrated in the nonlimiting example of FIG. 7A, multiplexor 420 can receive a "1" value and a "0" value at input ports. Multiplexor 420 may also receive an absolute value of A0<Pquant as the select input. Similarly, multiplexor 422 can receive a "1" value and a "0" value, as well as A3<the absolute value of A0 490c. Multiplexor 424 can receive a "1" value, a "0" value, as input, and a clip value (from shifter 468, FIG. 7C) not equal to 0 as the select input. Additionally, data output from multiplexors 420, 422, 424 may be sent to logical "or" gate 426, which can send data to multiplexor 428. Multiplexor 428 may also receive filter_other_3 data as input. More specifically, a filter_other_3 signal may be generated as shown in FIG. 7A. This signal, if non-zero, indicates that the other three rows of pixels are to be filtered. Otherwise, the 4×4 block may not be filtered (modified). Multiplexor 428 selects to output data based on received processing pixel 3 data at select input.

Figure 7B:
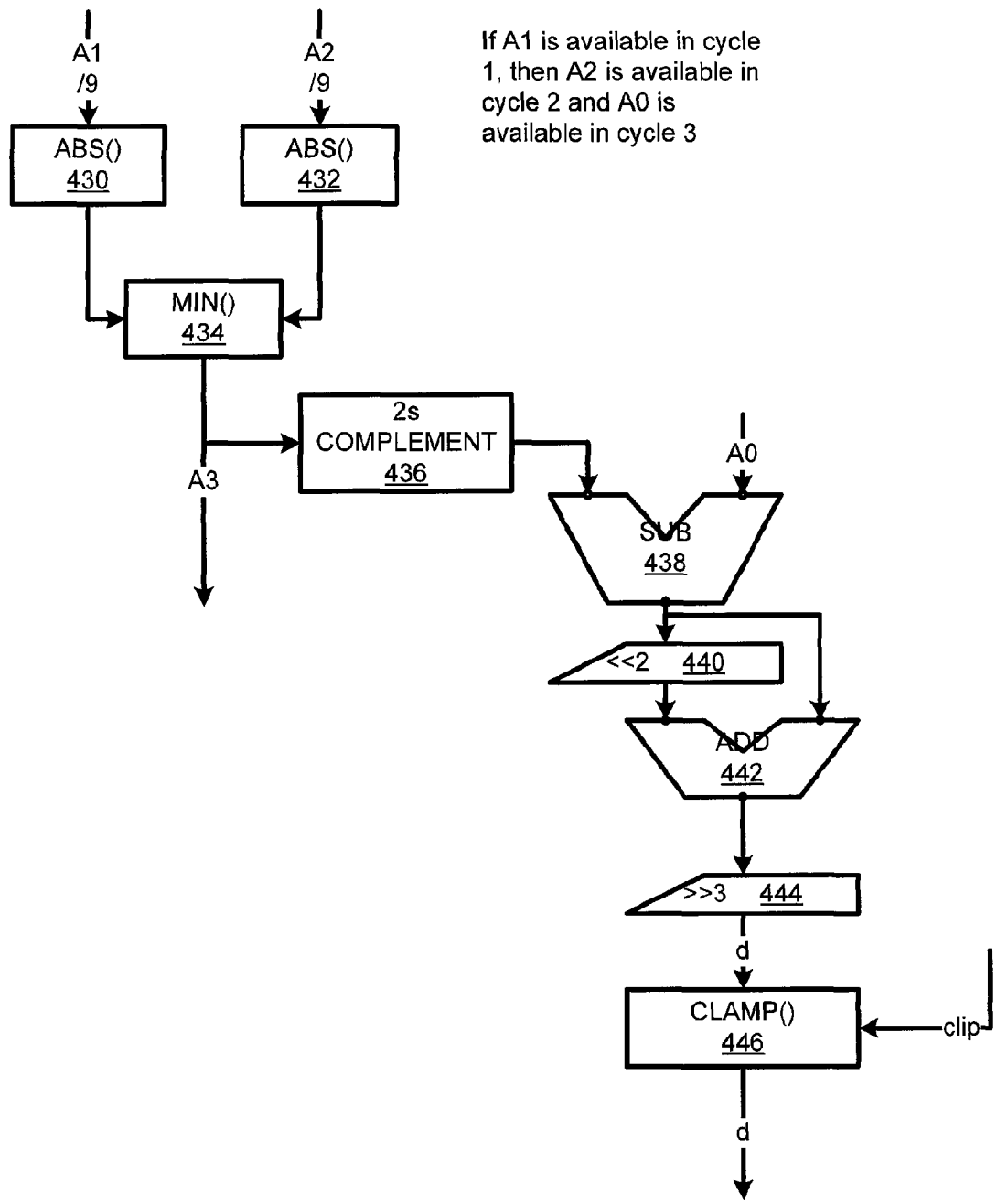
FIG. 7B is a continuation of the diagram from FIG. 7A.

FIG. 7B is a continuation of the diagram from FIG. 7A. More specifically, as illustrated in the nonlimiting example of FIG. 7A, absolute value component 430 receives 9-bit input A1 490a (from FIG. 7D). Absolute value component 432 receives 9-bit input A2 490b (from FIG. 7D). Upon calculating the absolute value of the received data, minimum component 434 determines the minimum of the received data and sends this data to 2's complement component 436 and as output A3. 2's complement component 436 takes the 2's complement of the received data and sends this data to subtraction component 438. Subtraction component subtracts this data from input data A0 490c (from FIG. 7D). This data is then sent to shifter 440, is shifted two places to the left, and is sent to adder 442. Additionally, the output of subtraction component 438 is input into adder 442. This allows the circuit to multiply by 5 without using a multiplier.

Adder adds the received data and sends the result to shifter 444. Shifter 444 shifts the received data three places to the right, and sends the data to clamp component 446. Clamp component 446 also receives clip data (from shifter 468, FIG. 7C) and sends the result to output. One should note that the result of the filter can be negative or larger than 255. So the clamp component 446 may be configured to clamp the result to be an unsigned 8-bit value. Thus, if the input d is negative, d will be set to 0. If d>clip, the d can be set to clip.

Figure 7C:
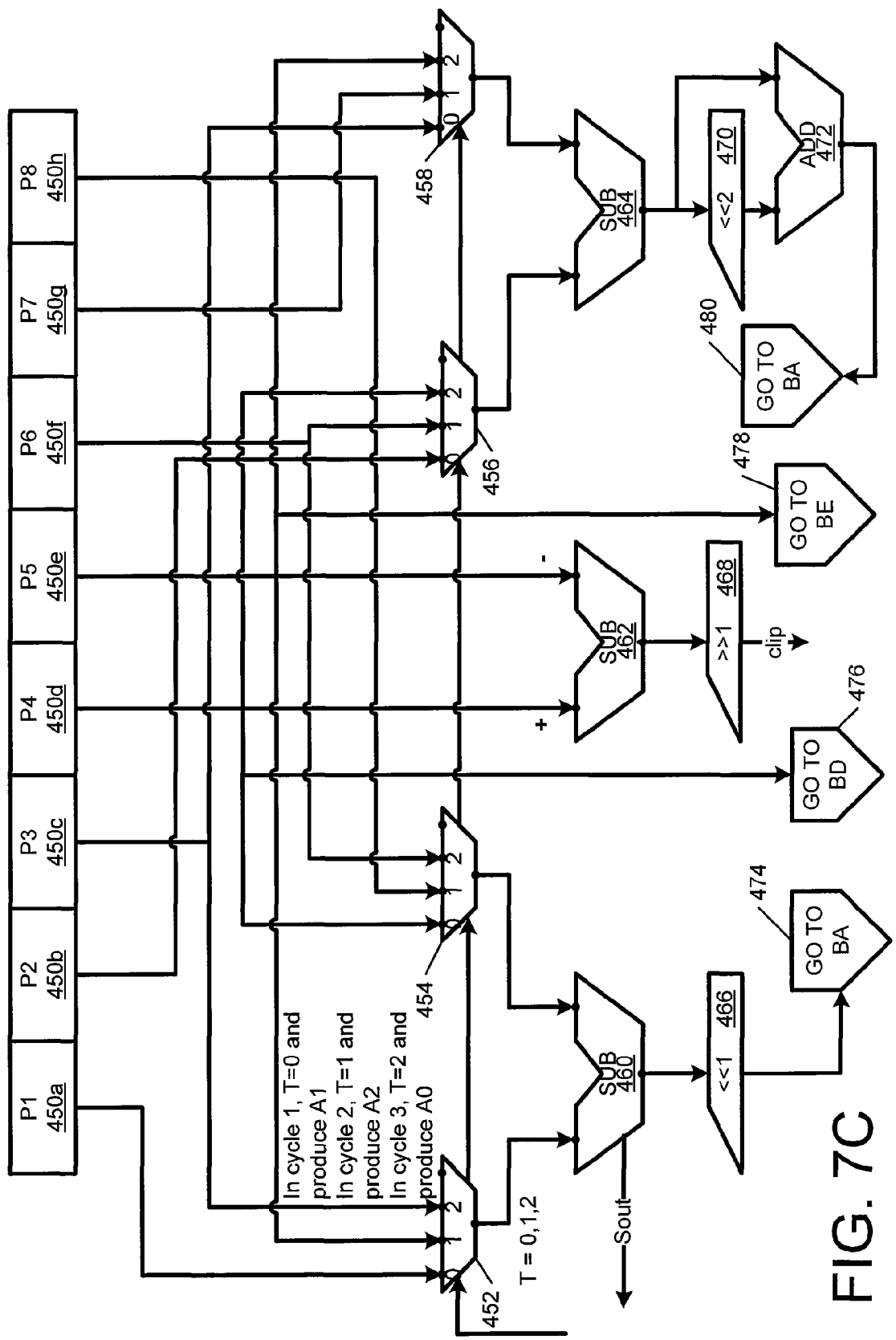
FIG. 7C is a continuation of the diagrams from FIGS. 7A and 7B.

FIG. 7C is a continuation of the diagrams from FIGS. 7A and 7B. As illustrated in the nonlimiting example of FIG. 7C, P1 data 450*a* is sent to multiplexor 452. Also received at multiplexor 452 is P5 data 450*e* and P3 data 450*c*. Multiplexor 452 receives select input and selects data to send to subtraction component 460. Multiplexor 452 also sends output data to the select input of multiplexor 454.

Multiplexor 454 also receives input data from P4 450*d*, P8 450*h*, and P6 450*f*. Multiplexor 454 sends output data to subtraction component 460. Subtraction component subtracts the received data and sends the result to shifter 466. Shifter 466 shifts the received data left one place and sends this result to jump block 474.

Similarly, multiplexor 456 receives input P2 450*b*, P6 450*f*, and P4 450*d*. Multiplexor 456 receives select input from multiplexor 454 and sends the selected data to subtraction component 464. Multiplexor 458 receives select input from multiplexor 456 and receives input data from P3 450*c*, P7 450*g*, and P5 450*e*. Multiplexor 458 sends output data to subtraction component 464. Subtraction component 464 subtracts the received data and sends this data to shifter 470 and adder 472. Shifter 470 shifts the received data two places to the left and sends the shifted data to adder 472. Adder 472 adds the received data and sends the result to jump block 480.

Additionally, subtraction component 462 receives data from P4 450*d* and P5 450*e*, subtracts the received data, and sends the result to shifter 468. Shifter 468 shifts the received data one place to the right and outputs this data as clip data, for input to clamp component 446 and multiplexor 424. Additionally, P4 450*d* is sent to jump block 476 and P3 450*e* data is sent to jump block 478.

Figure 7D:
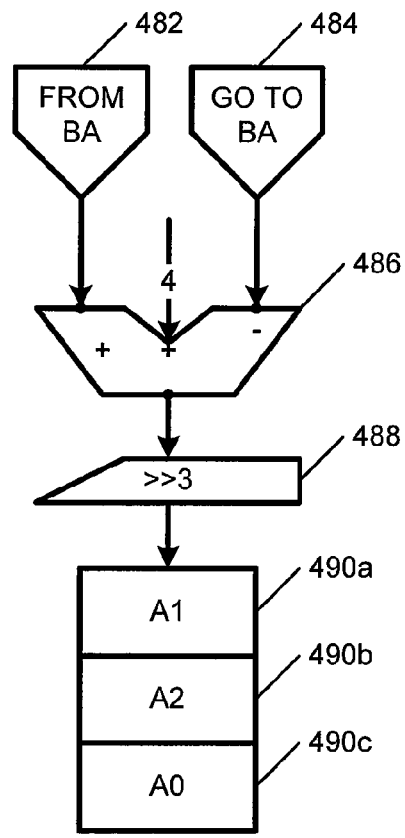
FIG. 7D is a continuation of the diagrams from FIGS. 7A-7C.
Figure 7D:
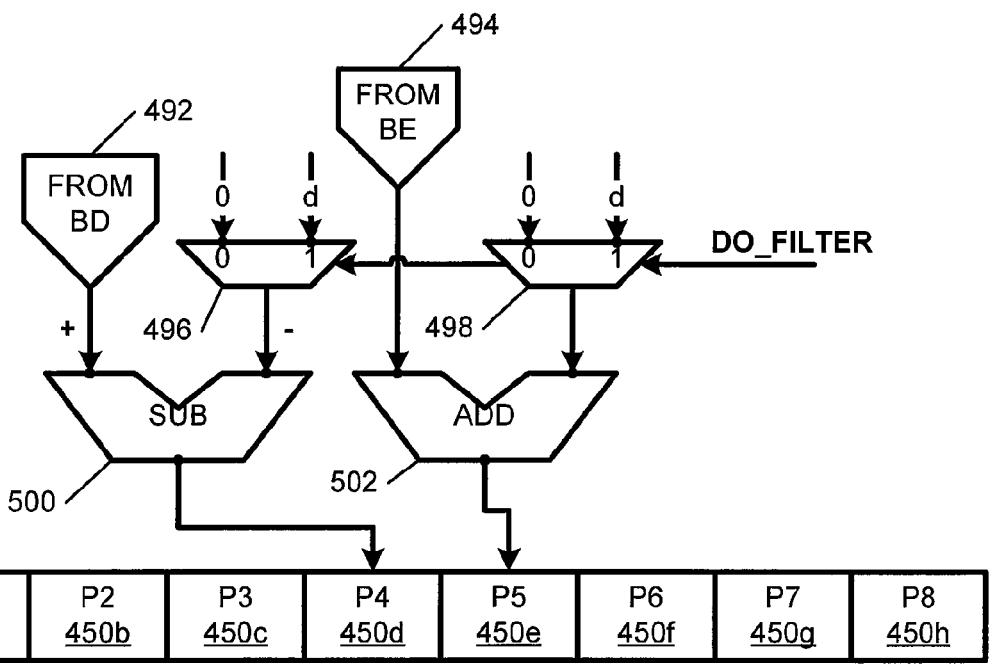

FIG. 7D is a continuation of the diagrams from FIGS. 7A-7C. More specifically, as illustrated in the nonlimiting example of FIG. 7D, subtraction component 486 receives data from jump block 482 and jump block 484. Subtraction component subtracts the received data and sends the result to shifter 488. Shifter 488 shifts the received data three places to the right and sends the results to A1 490*a*, A2 490*b*, and A0 490*c*.

Additionally, multiplexor 496 receives input data "0" and "d." The operation may include:

```
If (Do_filter) {
  P4[I] = P4[I] − D[I]
  P5[I] = P5[I] + D[I] }
```

Multiplexor 496 selects a desired result via do_filter select input. The result is sent to subtraction component 500. Subtraction component 500 also receives data from jump block 492 (via jump block 476, FIG. 7C) and subtracts the received data and sends the result to P4 450*d*.

Multiplexor 498 also receives "0" and "d" as inputs and do_filter as select input. Multiplexor 498 multiplexes this data and sends the result to adder 502. Adder 502 also receives data from jump block 494 (via jump block 478, FIG. 7C), adds the received input, and sends the result to P5 450*e*.

Figure 8:
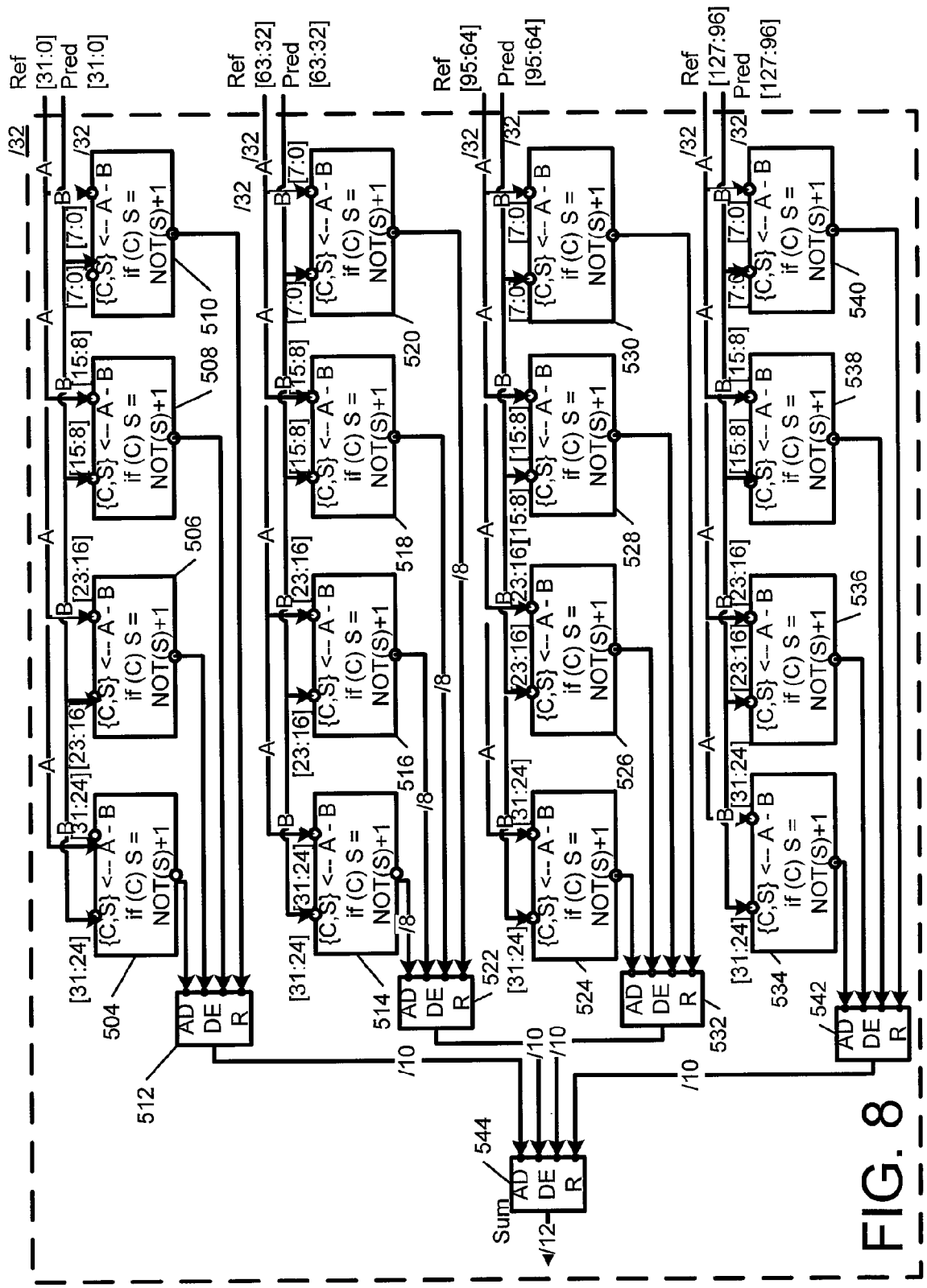
FIG. 8 is a block diagram illustrating components that may be utilized for performing a sum of absolute differences calculation in a computing architecture, such as the computing architecture from FIG. 2.

FIG. 8 is a block diagram illustrating logical blocks that may be utilized for performing a sum of absolute differences calculation in a computing architecture, such as the computing architecture from FIG. 2. More specifically, as illustrated in the nonlimiting example of FIG. 8, component 504 receives a portion of the 32-bit data A [31:0], as well as a portion of the 32-bit data B. Component 504 provides output to adder 512 by determining whether {C,S}←A−B, if (C)s=Not (S)+1. Similarly, component 506 receives A data and B data and sends output to adder 512 based on a similar determination as component 504, except that component 506 receives [23:16] portion of A and B data, as opposed to the [31:24] data received at component 504. Similarly, component 508 receives [15:8] data, performs a similar calculation as components 504 and 506, and sends the result to adder 512. Component 510 receives [7:0] data, performs a similar computation as in components 504, 506, and 508, and sends the result to adder 512.

Additionally, components 514, 516, 518, and 520 receive a portion of 32-bit data A, corresponding to bits [63:32] (as opposed to the [31:0] data received at components 504-510). More specifically, component 514 receives [31:24] data associated with data A and data B. Component 514 performs a similar computation as discussed above, and sends an 8-bit result to adder 522. Similarly, component 516 receives [23:16] data, performs a similar computation, and sends resulting data to adder 522. Component 518 receives [15:8] data associated with data A and data B, processes the received data, as described above, and sends the result to adder 522. Component 520 receives [7:0] data associated with data A and data B, processes the received data, as discussed above, and sends the result to adder 522.

Components 524-530 receive 32-bit A data and 32-bit B data corresponding to [95:64] bits. More specifically, component 524 receives [31:24]. Component 526 receives [23:16]. Component 528 receives [15:8]. Component 530 receives [7:0] data. Upon receiving this data, components 524-530 may be configured to process the received data, as described above. The processed data may then be sent to adder 532. Similarly, components 534-540 receive 32-bit A data and B data corresponding to [127:96] bits. More specifically, component receives [31:24] data associated with A data and B data. Component 536 receives [23:16] data. Component 538 receives [15:8] data. Component 540 receives [7:0] data. The received data is processed, as discussed above, and send to adder 542. Additionally, adders 512, 522, 532, and 542 add the received data and send the 10-bit result to adder 544. Adder 544 adds the received data and sends 12-bit data to output.

Figure 9:
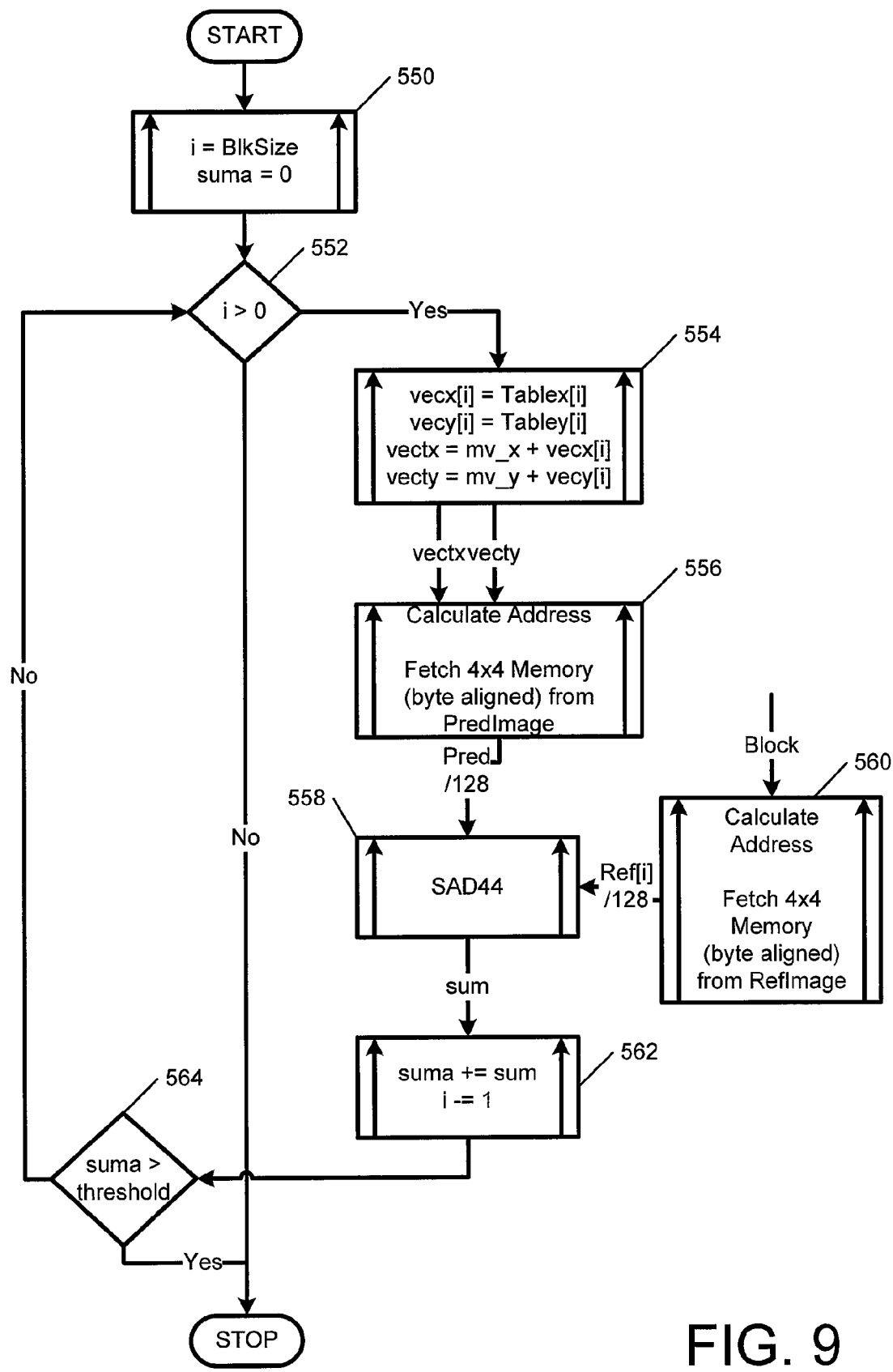
FIG. 9 is a flowchart illustrating an exemplary embodiment of a process that may be utilized in performing a sum of absolute differences calculation, similar to the diagram from FIG. 8.

FIG. 9 is a flowchart illustrating an exemplary embodiment of a process that may be utilized in performing a sum of absolute differences calculation, similar to the diagram from FIG. 8. More specifically, as illustrated in the nonlimiting example of FIG. 9, "i" is defined as BlkSize and suma is initialized as "0" (block 550). A determination is made whether I greater than "0" (block 552). If I is greater than "0," then vecx[i]=Tabelx[i], vecy[i]=Tabely[i], vectx=mv_x+vecx[i], and vecty=mv_y+vecy[i] (block 554). An address can be calculated from vectx and vecty. 4×4 memory (byte aligned) may also be fetched from PredImage (block 556). 128-bit Pred data may be sent to SAD 44 (see FIG. 8), as illustrated in block 558. Additionally, block 560 can receive block data and calculate an address. At block 560, 4×4 memory may also be fetched from (and byte aligned) from RefImage. 128-bit Ref[i] data may then be sent to SAD 44 (block 558). From SAD 44, a sum may be sent to block 562. Sum data may be incremented by "1" and I may be decremented by "1." A determination can then be made whether suma is greater than a threshold value (block 564). If yes, the process may stop. If, on the other hand, suma is not greater than the threshold value, the process may return to block 552 to determine whether i is greater than 0. If i is not greater than 0, the process may end.

Figure 10A:
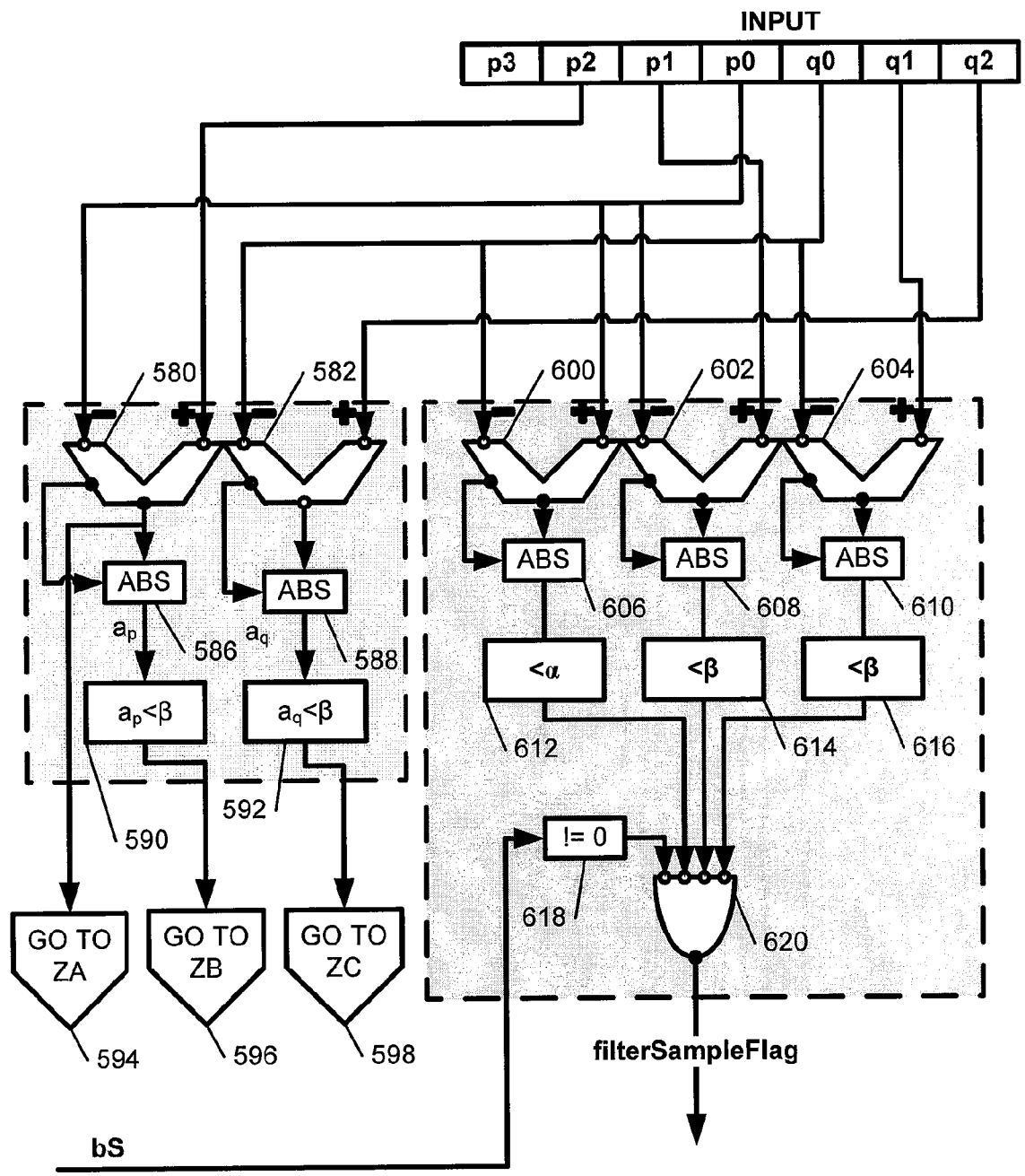
FIG. 10A is a block diagram illustrating a plurality of components that may be utilized in a deblocking operation, such as may be performed in the computer architecture from FIG. 2.

FIG. 10A is a block diagram illustrating a plurality of components that may be utilized in a deblocking operation, such as may be performed in the computer architecture from FIG. 2. As illustrated in the nonlimiting example of FIG. 10A, ALU 580 receives input data p2 and p0 and sends data to absolute value component 586. Absolute value component 586 takes the absolute value of the received data and outputs data $a_p$. Determination component 590 determines whether $a_p$ is less than β, and sends data to jump block 596. ALU 580 also sends data to jump block 594. Similarly, ALU 582 receives data from q0 and q2. After computing a result, ALU 582 sends data to absolute value component, which determines an absolute value of the received data and sends $a_q$ to determination component 592. Determination component 592 determines whether $a_q$ is less than β, and sends data to jump block 598.

ALU 600 receives data from q0 and p0, computes a result, and sends the result to absolute value component 606. Absolute value component 606 determines an absolute value associated with the received data and sends that value to determination component 612. Determination component 612 determines whether the received value is less than α and sends a result to "and" gate 620. ALU 602 receives data from p0 and p1, calculates a result, and sends the result to absolute value component 608. Absolute value component 608 determines an absolute value of the data received and sends this value to determination component 614. Determination component 614 determines whether the received data is less than β, and sends a result to "and" gate 620. ALU 604 receives data from q0 and q1, calculates a result, and sends the result to absolute value component 610. Absolute value component 610 determines the absolute value of the received data and sends the result to determination component 616. Determination component 616 determines whether the received data is less than β, and sends the result to "and" gate 620. Additionally, "and" gate 620 receives data from determination component 618. Determination component receives bS data and determines whether this data is not equal to zero.

Figure 10B:
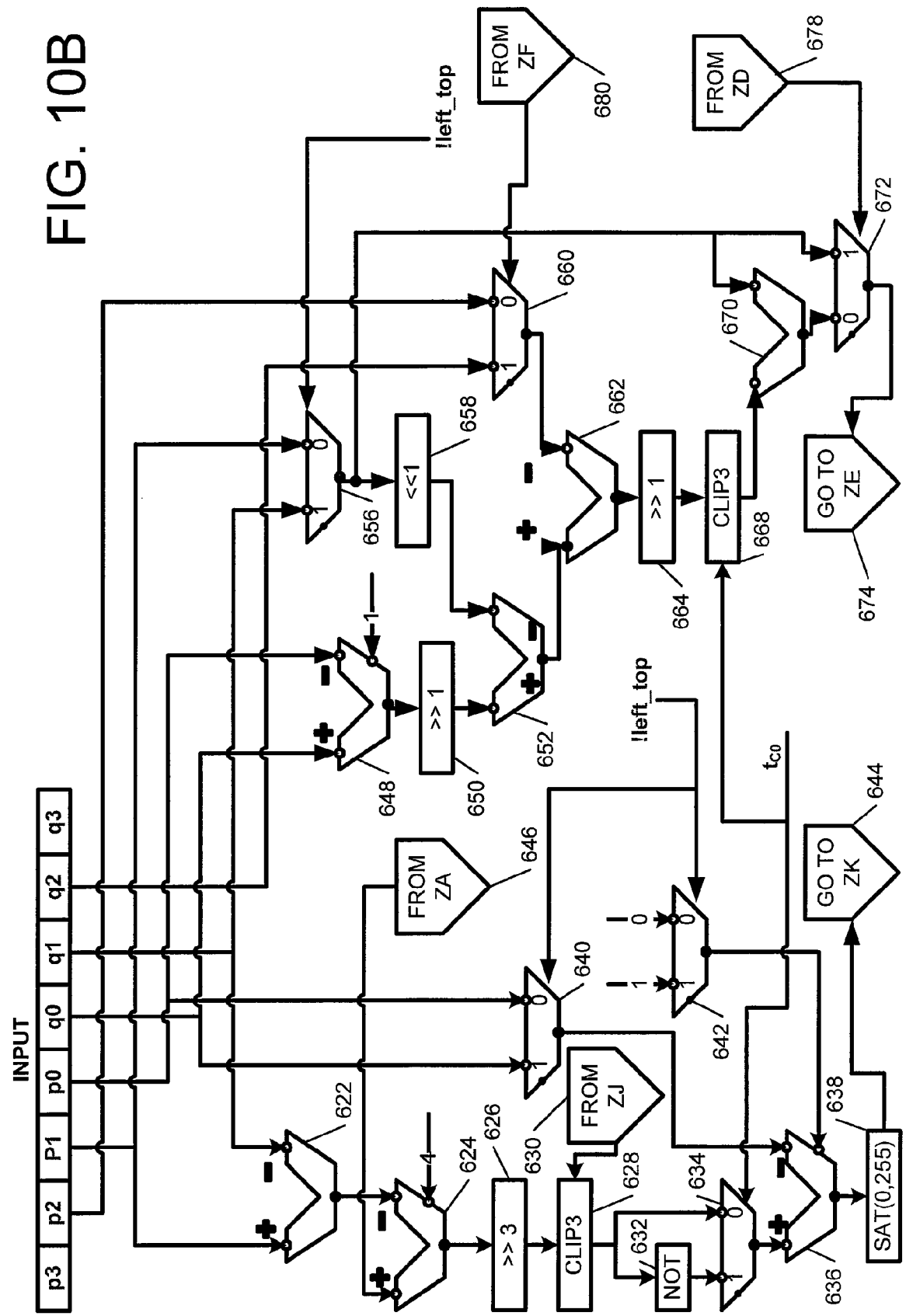
FIG. 10B is a continuation of the diagram from FIG. 10A.

FIG. 10B is a continuation of the diagram from FIG. 10A. More specifically, ALU 622 receives data from p1 and q1, computes a result and sends data to ALU 624. ALU 624 also receives data from jump block 646 (via ALU 580, from FIG. 10A), as well as 4-bits of data at carry input. ALU 624 then computes a result and sends the result to shifter 626, which shifts received data three places to the right. Shifter 626 then sends data to clip3 component 628, which also receives data from jump block 630 (via ALU 744, FIG. 10D, described in more detail below). Clip3 component 628 sends data to multiplexor 634 and to not gate 632. Not gate 632 inverts the received data and sends the inverted data to multiplexor 634. Multiplexor also receives $t_{c0}$ data at select input, and sends the selected data to ALU 636. ALU 636 also receives data from multiplexor 640. Multiplexor 640 receives data from q0 and p0 and receives select input from !left_top. Received at carry input of ALU 636 is data from multiplexor 642. Multiplexor 642 receives a "1" and a "0," as well as !left_top data. ALU 636 sends a result to SAT (0,255) 638, which sends data to jump block 644 (continued at multiplexor 790, FIG. 10E).

Additionally, ALU 648 receives data from q0 and p0, as well as one bit of data at select input. ALU 648 calculates a result and sends this data to shifter 650. Shifter 650 shifts the received data one place to the right and sends the shifted data to ALU 652. Similarly, multiplexor 656 receives data from p1 and q1, as well as !left_top. Multiplexor 656 determines a result and sends the result to shifter 658. Shifter 658 shifts the received data one place to the left and sends the shifted data to ALU 562. ALU 652 computes a result and sends the data to ALU 662. ALU 662 also receives data from multiplexor 660. Multiplexor 660 receives q2 and p2, as well as data from jump block 680 (via not gate 802, from FIG. 10E).

ALU 662 computes a result and sends this data to shifter 664. Shifter 664 shifts the received data one place to the right, and sends the shifted data to clip3 component 668. Clip3 component 668 also receives $t_{c0}$ and sends data to ALU 670. ALU 670 also receives data from multiplexor 656. ALU 670 computes a result and sends this data to multiplexor 672. Multiplexor 672 also receives data from multiplexor 656, as well as data from jump block 678 (via multiplexor 754, from FIG. 10E). Multiplexor 672 sends data to jump block 674.

FIG. 1C is a continuation of the diagrams from FIGS. 10A and 10B. As illustrated in the nonlimiting example of FIG. 10C, multiplexor 682 receives data from p2, p1, and !left_top. Multiplexor 682 sends the selected data to adder 706. Multiplexor 684 receives p1 and p0 with !left_top, and sends a result to shifter 700. Shifter 700 shifts the received data one place to the left and sends to adder 706. Multiplexor 686 receives data from p0 and q1, as well as !left_top. Multiplexor 686 sends data to shifter 702, which shifts the received data one place to the left, and sends the shifted data to adder 706. Multiplexor 688 receives data from q0 and q1, as well as !left_top. Multiplexor 688 sends the selected data to shifter 704, which shifts the received data one place to the left, and sends to adder 706. Multiplexor 690 receives data from q1 and q2, as well as !left_top, and sends data to adder 706. Adder 706 also receives 4 bits of carry input and sends output to jump block 708.

Similarly, multiplexor 691 receives q2, p0, and !left_top. Multiplexor 691 selects a result and sends the selected result to adder 698. Multiplexor 692 receives p1, p0, and !left_top, and sends a selected result to adder 698. Multiplexor 694 receives data from q0, q1, and !left_top. Multiplexor 694 selects a result and sends the selected result to adder 698. Multiplexor 696 receives q0, q2, and !left_top. Multiplexor 696 selects a desired result and sends this data to adder 698. Adder also receives 2 bits of carry input and sends output to jump block 710.

Multiplexor 712 receives p3, q3, and !left_top and sends result to shifter 722. Shifter 722 shifts the received data one place to the left and sends to adder 726. Multiplexor 714 receives p2, q2, and !left_top and sends a selected result to shifter 724 and adder 726. Shifter 724 shifts the received data one place to the left and sends the shifted result to adder 726. Multiplexor 716 receives p1, q1, and !left_top and sends a selected result to adder 726. Multiplexor 718 receives p0, q0, and !left_top and sends a selected result to adder 726. Multiplexor 720 receives p0, q0, and !left_top, and sends a selected result to adder 726. Adder 726 receives four bits at carry input and adds the received data. The added data is sent to jump block 730.

Figure 10C:
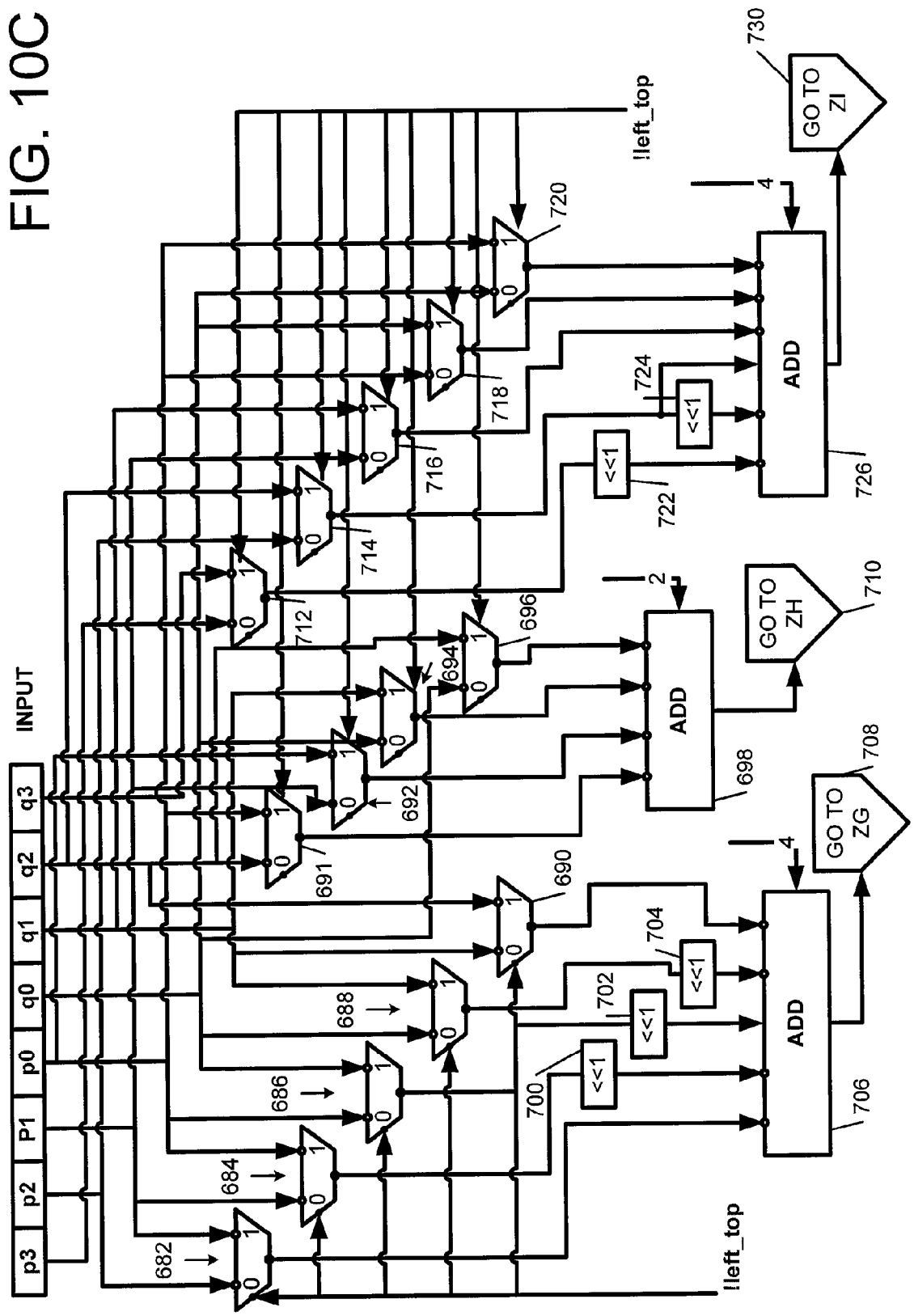
FIG. 10C is a continuation of the diagrams from FIGS. 10A and 10B.
Figure 10D:
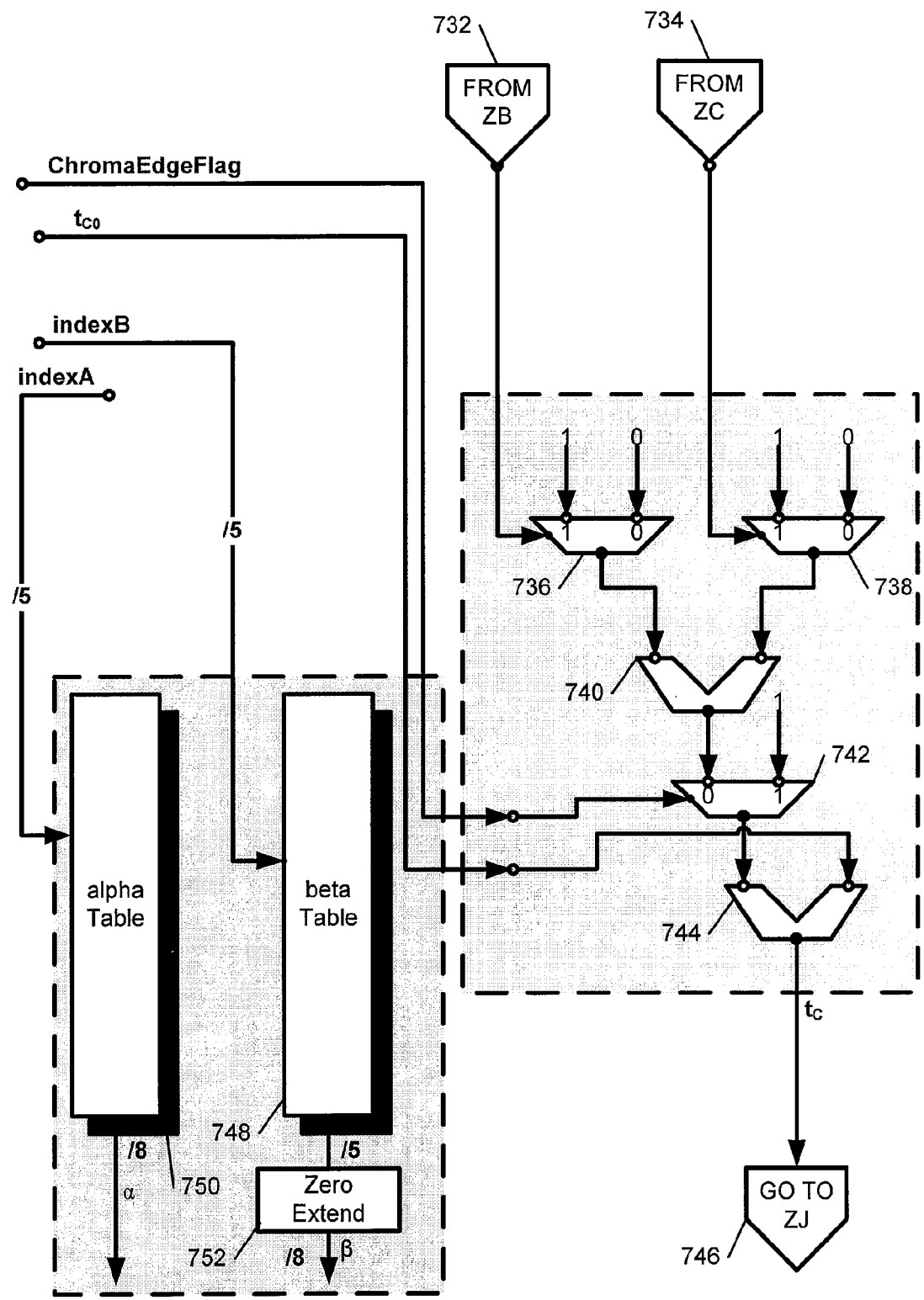
FIG. 10D is a continuation of the diagrams from FIGS. 10A-10C.

FIG. 10D is a continuation of the diagrams from FIGS. 10A-10C. More specifically, as illustrated in the nonlimiting example of FIG. 10D, alpha table 750 receives indexA and outputs α. Beta table 748 receives indexB and outputs data to zero extend component 752. Zero extend component 752 outputs β.

Similarly, multiplexor 736 receives "1" and "0" as well as data from jump block 732 (via determination block 590, from FIG. 10A). Multiplexor 736 selects a result and sends the selected result to ALU 740. Multiplexor 738 also receives "1" and "0," as well as data from jump block 734 (via determination block 592 from FIG. 10A). Multiplexor 738 sends a selected result to ALU 740. ALU 740 computes a result and sends data to multiplexor 742. Multiplexor 742 also receives "1," as well as chroma edge flag data. Multiplexor 742 selects a result and sends the selected result to ALU 744. ALU 744 also receives $t_{c0}$, computes result $t_c$, and sends result to jump block 746.

Figure 10E:
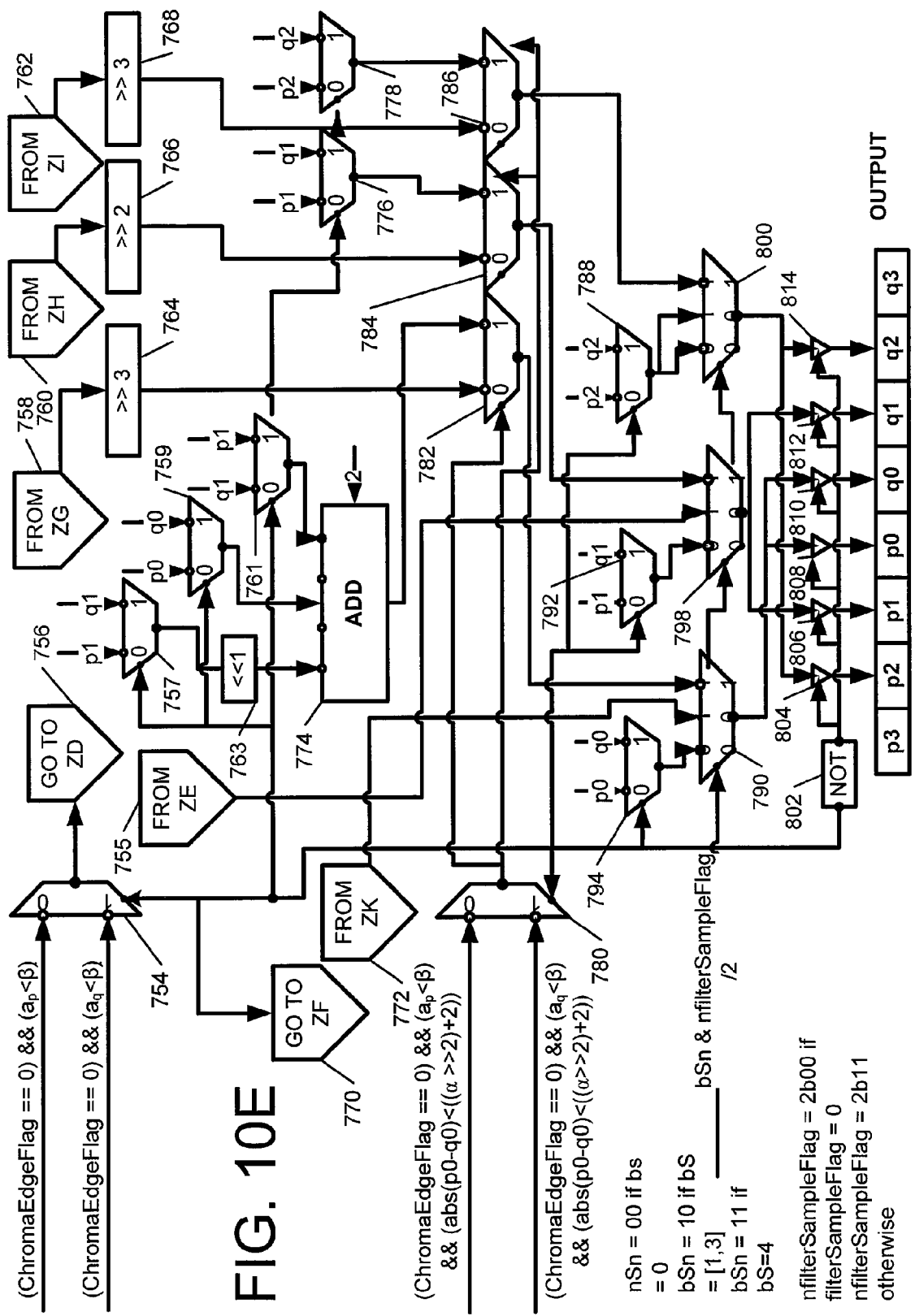
FIG. 10E is a continuation of the diagrams from FIGS. 10A-10D.

FIG. 10E is a continuation of the diagrams from FIGS. 10A-10D. More specifically, as illustrated in the nonlimiting example of FIG. 10E, multiplexor 754 receives data associated with the statement "ChromaEdgeFlag==0) &&($a_p$<β)." Multiplexor 754 also receives data associated with the statement "ChromaEdgeFlag==0) &&($a_q$<β)." Multiplexor 754 also receives data from not component 802 and sends selected data to jump block 756 (to multiplexor 672, from FIG. 10B).

Additionally, multiplexor 780 receives data associated with the statement "ChromaEdgeFlag==0) &&($a_p$<β) &&(abs(p0−q0)<((α>>2)+2))," as well as data associated with the statement "ChromaEdgeFlag==0) &&($a_q$<β) &&(abs(p0−q0)<((α>>2)+2))." Multiplexor 780 also receives select input from not component 802. Multiplexor selects a desired result and sends the result data to multiplexors 782, 784, and 786.

Multiplexor 757 receives data from p1, q1, and "not" component 802. Multiplexor sends selected data to shifter 763, which shifts the received data one place to the left, and sends to adder 774. Multiplexor 759 receives p0, q0, and data from "not" component 802, and sends selected data to adder 774. Multiplexor 761 receives data from q1, p1, and "not" component 802, and sends data to adder 774. Adder 774 also receives two bits of data at carry input and sends output to multiplexor 782.

Shifter 764 receives data from jump block 758 (via adder 706, FIG. 10C) and shifts the received data three placed to the right. Shifter 764 sends the shifted data to multiplexor 782. Shifter 766 receives data from jump block 760 (via adder 698, FIG. 10C) and shifts the received data two places to the right. Shifter 766 sends the shifted data to multiplexor 784. Shifter 768 receives data from jump block 762 (from adder 726, FIG. 10C) and shifts the received data three places to the right. Shifter 768 sends the shifted data to multiplexor 786.

As discussed above, multiplexor 782 receives data from shifter 764 and adder 782, as well as multiplexor 780. Multiplexor 782 selects a result from this data and sends the selected result to multiplexor 790. Similarly, multiplexor 784 receives data from shifter 766, as well as data multiplexor 780 and data from multiplexor 776. Multiplexor 776 receives p1, q1, and data from "not" component 802. Multiplexor 784 sends a selected result to multiplexor 798. Multiplexor 786 receives data from shifter 768, as well as data from multiplexor 780 and data from multiplexor 778. Multiplexor 778 receives p2, q2, and data from not component 802. Multiplexor 786 sends selected data to multiplexor 800.

Multiplexor 790 receives data from multiplexor 782, as discussed above. Additionally, multiplexor 790 receives data from jump block 772 (via SAT component 638, FIG. 10B), as well as data from multiplexor 794. Multiplexor 794 receives p0, q0, and data from not component 802. Multiplexor 790 also receives bSn & nfilterSampleFlag data as select input. Multiplexor 790 sends selected data to buffers 808 and 810. Similarly, multiplexor 798 receives data from multiplexor 784 and jump block 755 (via multiplexor 674, FIG. 10B).

Additionally, multiplexor 798 receives data from multiplexor 792 and select input bSn & nfilterSampleFlag data. Multiplexor 792 receives p1, q1, as well as data from not component 802. Multiplexor 798 sends data to buffers 806 and 812. Similarly, multiplexor 800 receives data from multiplexor 786 and receives bSn & nfilterSampleFlag data as select input. Additionally, multiplexor 800 receives data from multiplexor 788. Multiplexor 788 receives p2, q2, and data from not component 802. Multiplexor 800 selects a desired data and sends the data to buffers 806 and 814. Buffers 804-814 also receive data from not component 802 and send data to p2, p1, p0, q0, q1, and q2, respectively.

Figure 11:
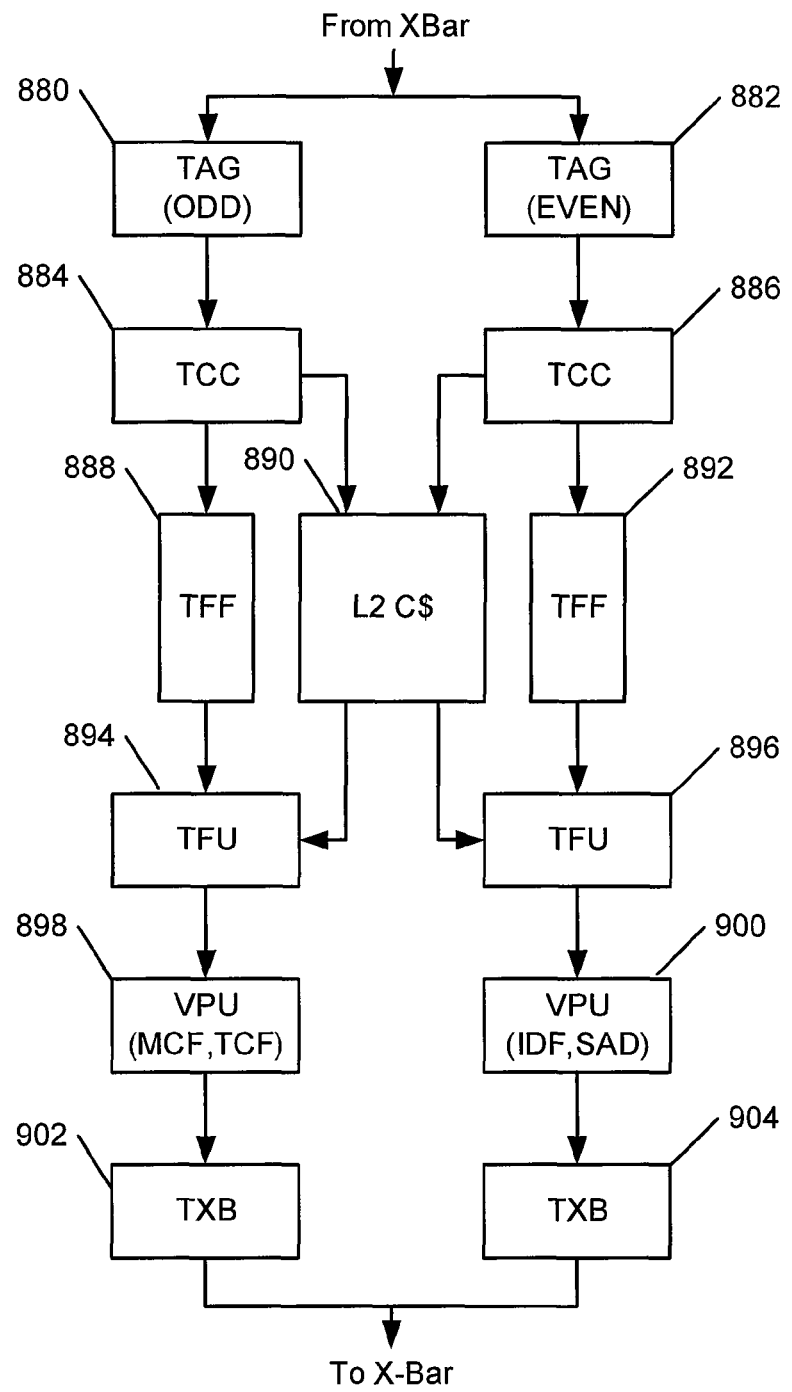
FIG. 11 is a flowchart illustrating an exemplary embodiment of a process that may be utilized in executing data in a computing architecture, such as the computing architecture from FIG. 2.

FIG. 11 is a flowchart illustrating an exemplary embodiment of a process that may be utilized in executing data in a computing architecture, such as the computing architecture from FIG. 2. As illustrated in the nonlimiting example of FIG. 10, from output cross bar 144 (FIG. 2), data is received at Texture Address Generator—TAG (odd) block 880 and tag (even) block 882 (see also 150 from FIG. 2). An address is generated for the received data and the process receives to Texture Cache and Controller (TCC) 884, 886 (see also FIG. 2, 166).

Data may then be sent to cache 890, as well as Texture Filter First In First Out (TFF) 888, 892, which may be configured to act as a latency queue/buffer. Data is then sent to Texture Filter Unit at blocks 894, 896 (see also FIG. 2, 168). Upon filtering the data, TFU, sends data to a VPU 898, 900 (see also FIG. 2, 199). Depending on whether instructions call for motion compensation filtering, Texture Cache Filtering, Inter-Deblocking Filtering, and/or Sum of Absolute Differences, the data may be sent to different VPUs and/or different portions of the same VPU. After processing the received data, VPUs 898, 900 may send the data to output for input crossbar 902, 904 (see also FIG. 2, 142).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software and/or hardware. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A programmable Video Processing Unit (VPU) for processing video data in at least two formats, comprising:
    filter logic circuit configured to filter the video data according to the format of the video data;
    transform logic circuit configured to transform the video data according to the format of the video data; and
    logic circuit configured to output the video data for future processing,
    wherein the filter logic circuit is configured to operate in parallel with the transform logic circuit.

2. The programmable VPU of claim 1, wherein the video data is chosen from at least one of the following formats: H.264, MPEG-2 and VC-1.

3. The programmable VPU of claim 1, wherein the filter logic circuit performs motion compensation filtering.

4. The programmable VPU of claim 1, wherein the transform logic circuit performs integer transform in response to a determination that the at least two formats include H.264 and VC-1.

5. The programmable VPU of claim 1, wherein the transform logic circuit performs discrete cosine transform in response to a determination that an MPEG-2 format is utilized.

6. The programmable VPU of claim 1, further comprising deblocking logic circuit in parallel with the filter logic circuit and the transform logic circuit, the deblocking logic circuit configured to perform inloop filtering on the video data.

7. A method for processing video data, comprising:
    receiving at a texture filter unit an instruction set;
    receiving video data having a format chosen from at least two formats at the texture filter unit;
    filtering at the texture filter unit the instruction set;
    responsive to the format indicated by an instruction in the instruction set, determining which of a plurality of video processing units to send the video data for processing;
    providing the video data to a one of the plurality of video processing units based on the determination; and
    processing by the video processing unit the video data according to the instruction,
    wherein the processing of video data utilizes a plurality of algorithms in response to the indication of the format.

8. The method of claim 7, wherein the data chosen from the at least two formats includes at least one of the following: Moving Picture Experts Group (MPEG) data, VC-1 data, and H.264 data.

9. The method of claim 7, wherein the processing of video data utilizing the plurality of algorithms includes at least two of the following: motion compensation, integer transform, inverse discrete cosine transform, and inloop filtering.

10. The method of claim 9, wherein the processing of video data comprises motion compensation and inverse discrete cosine transform in response to the indication is an MPEG-2 format.

11. The method of claim 9, wherein the processing of video data comprise motion compensation, integer transform, inloop filtering in response to the indication is a VC-1 format.

12. The method of claim 9, wherein the processing of video data comprises motion compensation, integer transform, inloop filtering in response to the indication is an H.264 format.

13. The method of claim 7, further comprising performing a sum of absolute differences computation.

14. The method of claim 7, further comprising performing a texture cache filtering.

15. The method of claim 7, further comprising performing Inter-Deblocking filtering.

16. The method of claim 7, wherein responsive to a second instruction in the instruction set, providing the video data to one of a plurality of different portions of the video processing unit based on the second instruction.

* * * * *